(12) United States Patent
Tanaka et al.

(10) Patent No.: US 7,719,824 B2
(45) Date of Patent: May 18, 2010

(54) ELECTRONIC APPARATUS AND UNIT

(75) Inventors: Kaigo Tanaka, Kawasaki (JP); Ikki Tatsukami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 109 days.

(21) Appl. No.: 11/452,364

(22) Filed: Jun. 14, 2006

(65) Prior Publication Data
US 2007/0217133 A1 Sep. 20, 2007

(30) Foreign Application Priority Data
Mar. 20, 2006 (JP) .............................. 2006-076115

(51) Int. Cl.
*H05K 7/14* (2006.01)
(52) U.S. Cl. ................................. 361/679.01
(58) Field of Classification Search ................ 361/679, 361/683, 684, 679.01, 679.02, 679.31
See application file for complete search history.

(56) References Cited

U.S. PATENT DOCUMENTS 5,544,142 A  8/1996  Funakiri .................... 369/75.1
6,201,693 B1 *  3/2001  Kamimaki et al. ..... 361/679.01

FOREIGN PATENT DOCUMENTS

| JP | 62-256295 | 11/1987 |
| JP | 06-243671 | 9/1994 |
| JP | 2000-250653 | 9/2000 |
| JP | 2001-14062 | 1/2001 |
| JP | 2001-014063 | 1/2001 |
| KR | 1990-0006783 | 7/1990 |
| KR | 93-5372 | 3/1993 |
| KR | 10-0556245 | 3/2005 |

OTHER PUBLICATIONS

Office Action issued in corresponding Korean Patent Application No. 10-2006-0064415, on Sep. 11, 2007.

* cited by examiner

*Primary Examiner*—Javaid Nasri
(74) *Attorney, Agent, or Firm*—Fujitsu Patent Center

(57) ABSTRACT

An electronic apparatus includes a housing having a hole, an electronic component disposed adjacent to the hole, and a support fitting that supports the electronic component. The support member has a partition that supports the electronic component and defines a space around the hole in cooperation with an inner wall of the housing.

9 Claims, 27 Drawing Sheets

ELECTRONIC APPARATUS AND UNIT

BACKGROUND OF THE INVENTION

1. Field of the Invention

The present invention relates to an electronic apparatus such as a notebook personal computer.

2. Description of the Related Art

In recent years, performance of electronic apparatus represented by notebook personal computers has been increased while a storage medium such as a large-capacity hard disk is mounted thereon to store a large amount of information. Also, because notebook personal computers excellent in portability are widely used and there is growing awareness of privacy protection, theft-protection measures are becoming absolutely essential.

Under such circumstances, locking devices for protecting an electronic apparatus from theft by restricting movements of the apparatus are available on the market. One of such locking devices has a locking member to be inserted into a hole formed in a part of the housing of the electronic apparatus. Once the locking member is inserted in the hole, it spreads out inside the hole so than it cannot be removed therefrom. The locking member is linked to a heavy immovable object with a chain or the like so that the apparatus cannot be freely moved (see Japanese Patent Application Publication No. 2001-14063 for example).

However, even if such a hole for locking is formed in the electronic apparatus, the hole is left unused in many cases because there are many users who do not have a locking device for their electronic apparatus or may use a locking device only inside a building but leave it removed when going out with the apparatus. In such cases, dust will enter through the hole formed in the electronic apparatus and eventually cover an air-cooling fan disposed inside the apparatus or peripheral areas of the fan, thereby blocking air circulation, which results in insufficient air-cooling.

To address such dust-related problems, Japanese Patent Application Publication No. 2001-14063 proposes such a structure that a plate is provided to cover the hole from inside and a spring is provided to urge the plate from behind. When the locking member is inserted into the hole, the plate is pushed by the locking member and retracts away from the hole.

However, the structure proposed in Japanese Patent Application Publication No. 2001-14063 requires components dedicated to blocking of the hole, such as a plate for covering the hole, a spring for urging the plate, a structure for supporting the spring and the like, resulting in cost increase.

In view of the foregoing, the present invention provides an electronic apparatus capable of preventing occurrence of malfunction due to insufficient air cooling, a short circuit, and the like caused by dust entering through the hole.

SUMMARY OF THE INVENTION

The present invention provides an electronic apparatus including:

a housing having a hole;

an electronic component disposed adjacent to the hole; and a support member that supports the electronic component, wherein the support member has a partition that supports the electronic component and defines a space around the hole in cooperation with an inner wall of the housing.

The electronic apparatus of the invention has such a structure that the support member for supporting the electronic component disposed adjacent to the hole is used as a divider for defining a space around the hole inside the housing in cooperation with an inner wall of the housing. This structure keeps dust entering through the hole from spreading beyond the defined space, thereby preventing occurrence of malfunction.

In the electronic apparatus according to the invention, the hole may be used to secure a locking device for restricting movements of the electronic apparatus.

Further, in the electronic apparatus according to the invention, the electronic component may be a connector for transferring signals to and from an external party.

Furthermore, in the electronic apparatus according to the invention, the connector may be a USB-compliant connector.

Still furthermore, in the electronic apparatus according to the invention, the housing may be a box-shaped housing having the hole at a position adjacent to a corner of a side surface of the housing, and the support member may define two surfaces of the space around the hole.

As described above, according to the invention, it is possible to prevent occurrence of malfunction caused by dust entering through the hole with a simple structure.

DETAILED DESCRIPTION OF THE INVENTION

An embodiment of the present invention will be described.

1. Appearance

Figure 1:
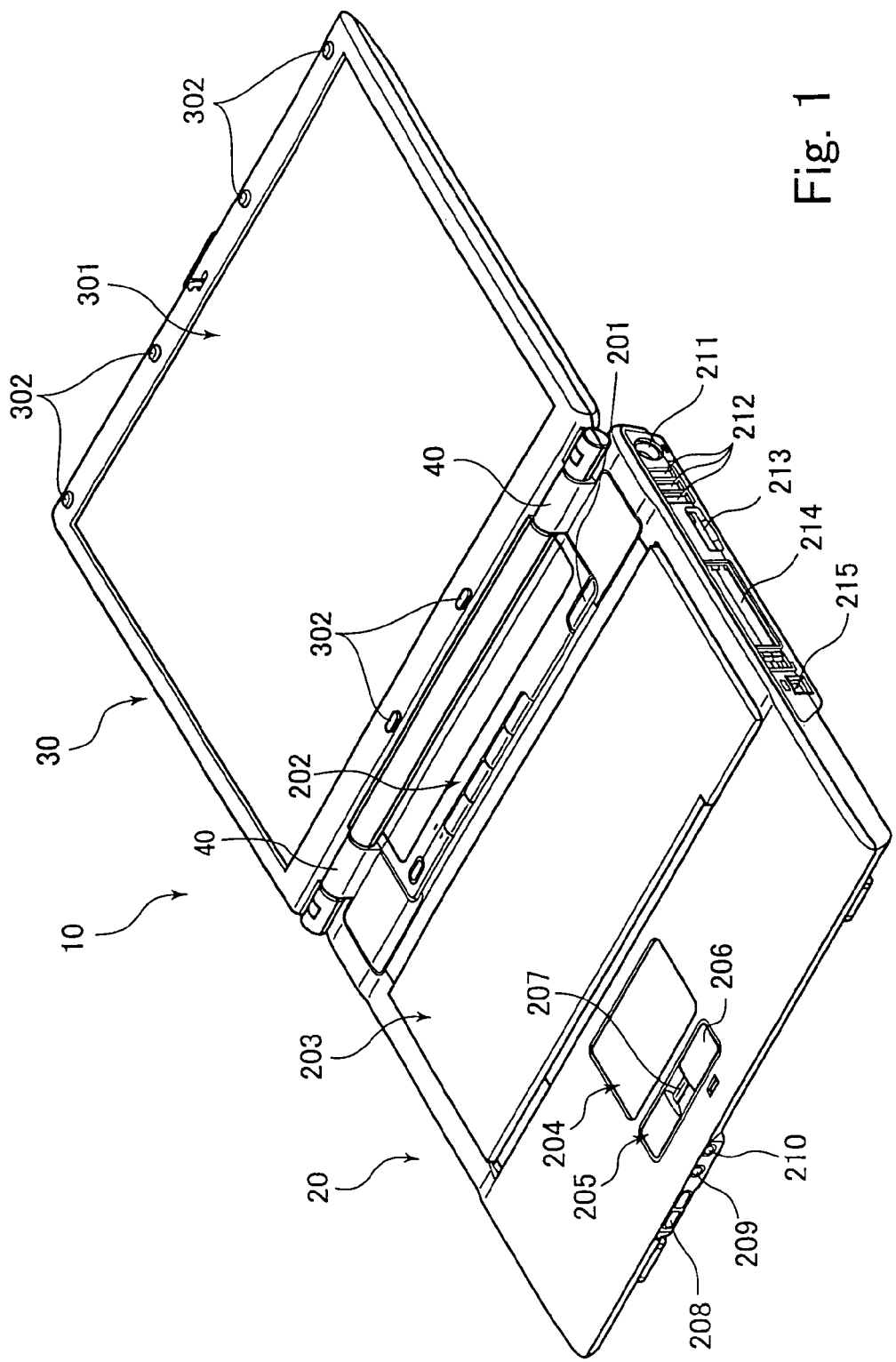
FIG. 1 is a diagram showing a display unit in open position.
Figure 2:
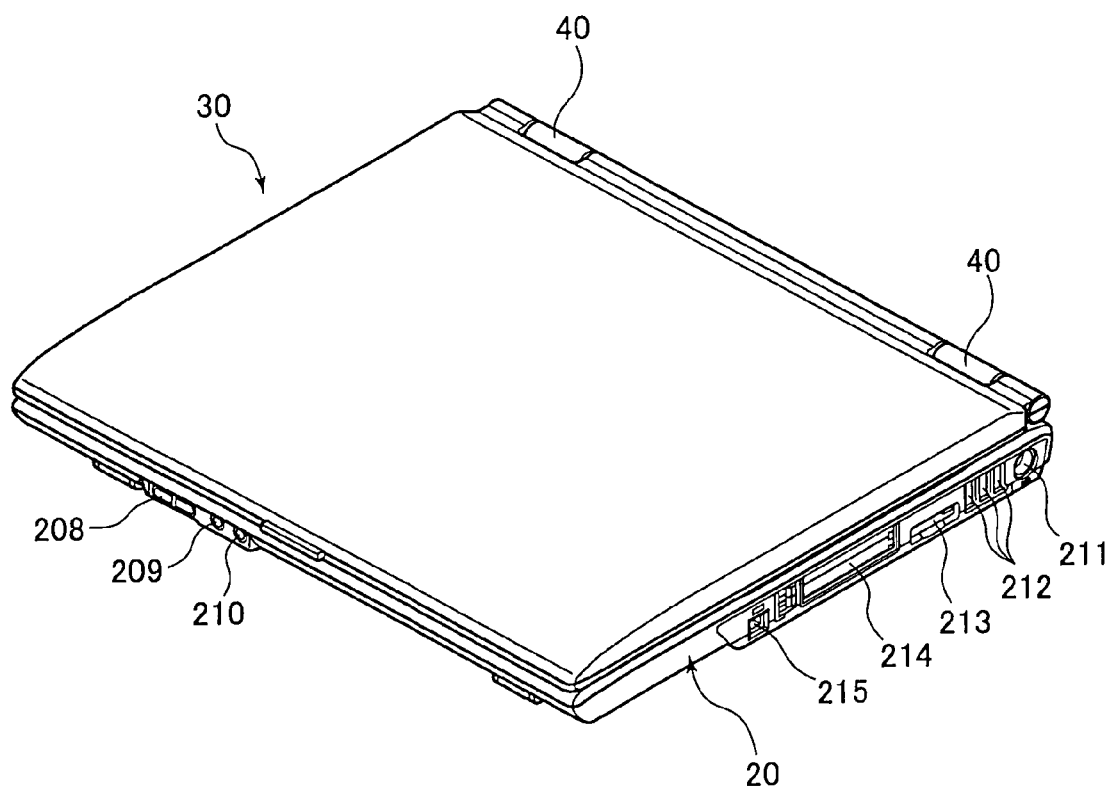
FIG. 2 is a diagram showing the display unit in closed position.

FIGS. 1 and 2 are perspective views of a notebook personal computer (hereinafter referred to as "notebook PC") 10 according to an embodiment of the present invention. FIGS. 1 and 2 illustrate the notebook PC 10 with a display unit 30 in an open state and a closed state, respectively.

The notebook PC 10 is composed of a main unit 20 and a display unit 30. Hinge sections 40 are provided to support the display unit 30 so that the display unit 30 can be opened and closed with respect to the main unit 20.

The main unit 20 includes a substantially box-shaped housing equipped with a power button 201, function buttons 202, a keyboard 203, a touchpad 204, a left-click button 205 and right-click button 206 for the touchpad 204, a fingerprint sensor 207 and the like. Disposed on the front end surface of the main unit 20 are a wireless LAN switch 208, a speaker connection terminal 209, a microphone connection terminal 210 and the like. The back of the touchpad 204 is overlaid with a digitizer as will be described later in detail. Further, disposed on the right flank of the main unit 20 are a DC power connection terminal 211, three USB connectors 212, a media slot 213 into which various media (SD card™, xD card™, etc.) are removably inserted, a PC card slot 214 into which a PC card is removably inserted, a IEEE1394 connector 215 and the like.

Although not shown in figures, the main unit 20 includes a built-in motherboard on which a CPU and various components are mounted. The motherboard is substantially equal to the keyboard 203 in size and disposed under the keyboard 203. Accordingly, the touchpad 204 and the digitizer on the back thereof are positioned on a so-called palmrest section of the main unit 20 avoiding an area covered by the motherboard.

The display unit 30 has a large-sized display screen 301 on the front surface thereof. Around the display screen 301, there are formed projections 302 for preventing the display screen 301 from directly abutting the top surface of the main unit 20 when the display unit 30 is closed on the main unit 20.

The hinge sections 40 are so configured as to support the display unit 30 in such a manner that the display unit 30 is openable and closable with respect to the main unit 20. The hinge sections 40 are disposed approximately at both ends of a laterally extending edge of the display unit 30, which edge faces the main unit 20. In a portion of the edge between the hinge sections 40, there is formed a space for accommodating cables that will be described later.

The display unit 30 needs to be rotatable with respect to the main unit 20 and at the same time, it must be capable of remaining in any position when the display unit 30 is open with respect to the main unit 20. For this purpose, the hinge sections 40 serve to apply friction so that the display unit 30 can remain in any position when the display unit 30 is open with respect to the main unit 20.

2. Touchpad and Digitizer

Figure 3:
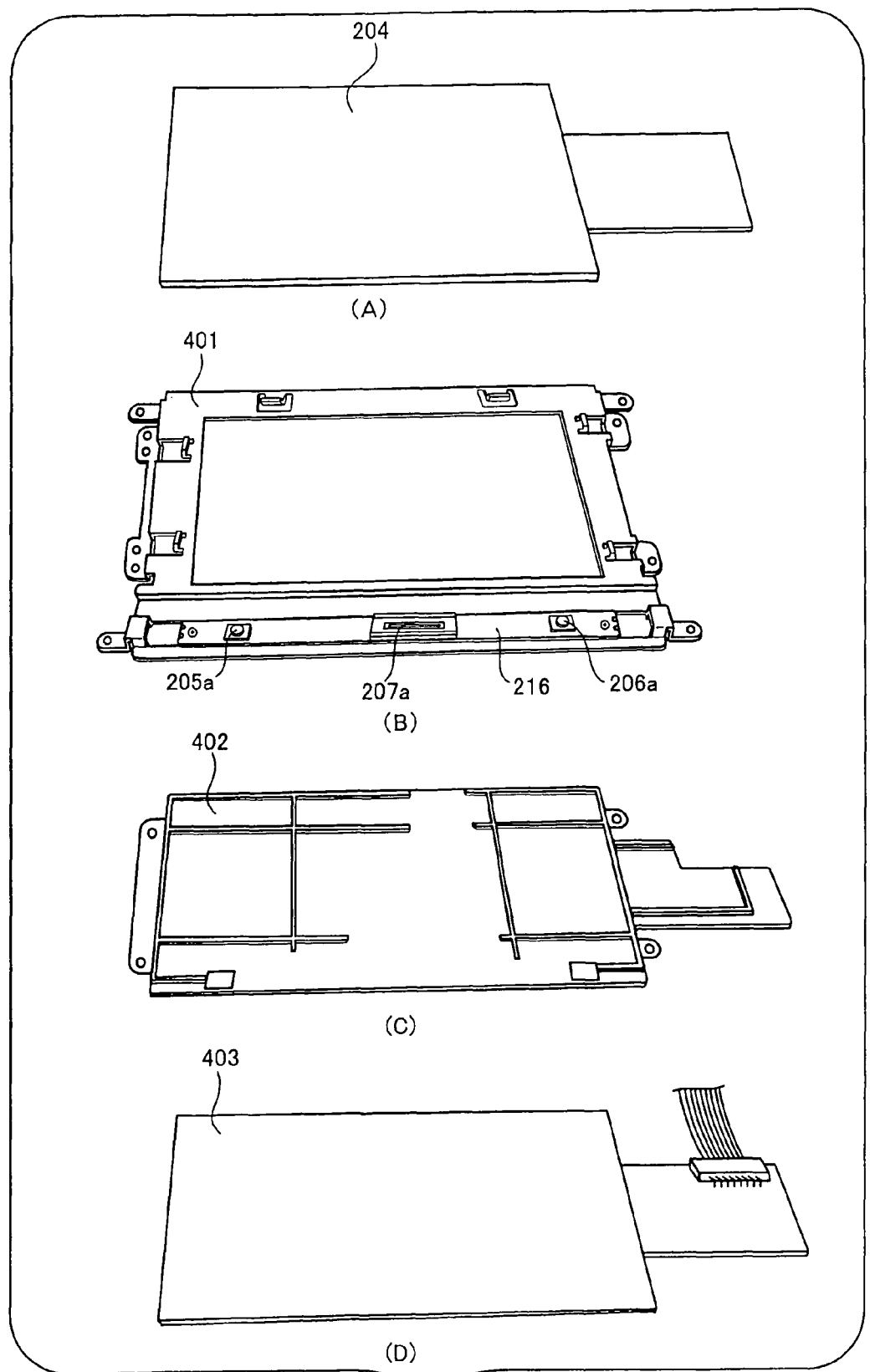
FIG. 3 is an exploded perspective view of a portion of a main unit of a notebook PC, where a touchpad is disposed.
Figure 4:
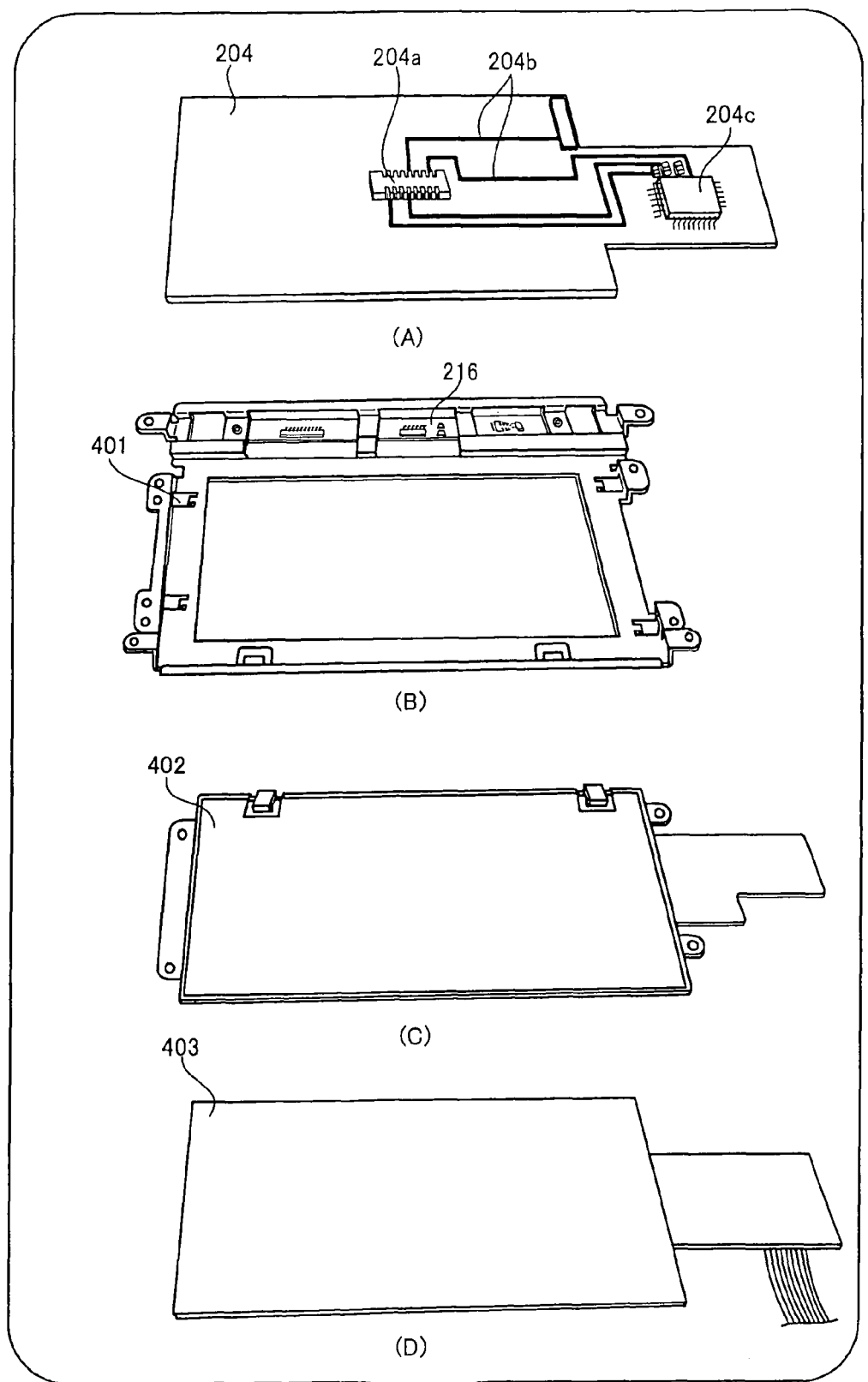
FIG. 4 is a perspective view of elements (A) through (D) shown in FIG. 3, as viewed from back.

FIG. 3 is an exploded perspective view of a portion of the main unit 20 of the notebook PC 10 shown in FIG. 1, where the touchpad 204 is disposed. FIG. 4 is a perspective view of elements (A) through (D) shown in FIG. 3, as viewed from back.

On the top surface of the main unit 20 shown in FIG. 1, there appears a surface of the touchpad 204 shown in part (A) of FIG. 3. Under the touchpad 204, a metal frame member 401 shown in part (B), a plastic support member 402 shown in part (C) and a digitizer 403 shown in part (D) are stacked in this order as shown in FIG. 3.

The touchpad 204 is configured to detect a movement or a position of a finger placed thereon by utilizing a change in the capacitance of a portion where the finger is placed, which change is caused by the placement of the finger. The touchpad 204 is used to move a cursor on the display screen 301 (see FIG. 1).

The metal frame member 401 supports the touchpad 204 disposed thereon. The metal frame member 401 also supports a circuit board 216 having thereon: a switch 205a for detecting the left-click button 205 being pressed; a switch 206a for detecting the right-click button 206 being pressed; and a line sensor 207a of the fingerprint sensor 207, which carries out actual detection of a touch.

The plastic support member 402 reinforces the digitizer 403 disposed thereunder and prevents a pressure applied on the touchpad 204 from being transmitted to the digitizer 403.

The digitizer 403 is capable of detecting a position and a movement of the tip of a stylus by utilizing magnetic effects caused by the stylus tapped and moved on the touchpad 204. The digitizer 403 is used to input handwritten characters, graphics, etc. made by movements of the tip of the stylus on the touchpad 204. The aspect ratio of an area, in which the digitizer 403 can detect the position of the tip of the stylus while the tip of the stylus is moved on the touchpad 204, is equal to the aspect ratio of the display screen 301 shown in FIG. 1. This allows a user to input information by handwriting it on the touchpad 204 while looking at a position displayed on the display screen 301.

As described above, the main unit 20 has the touchpad 204 and the digitizer 403 disposed thereon, which have different ways of detecting user operations.

Figure 5:
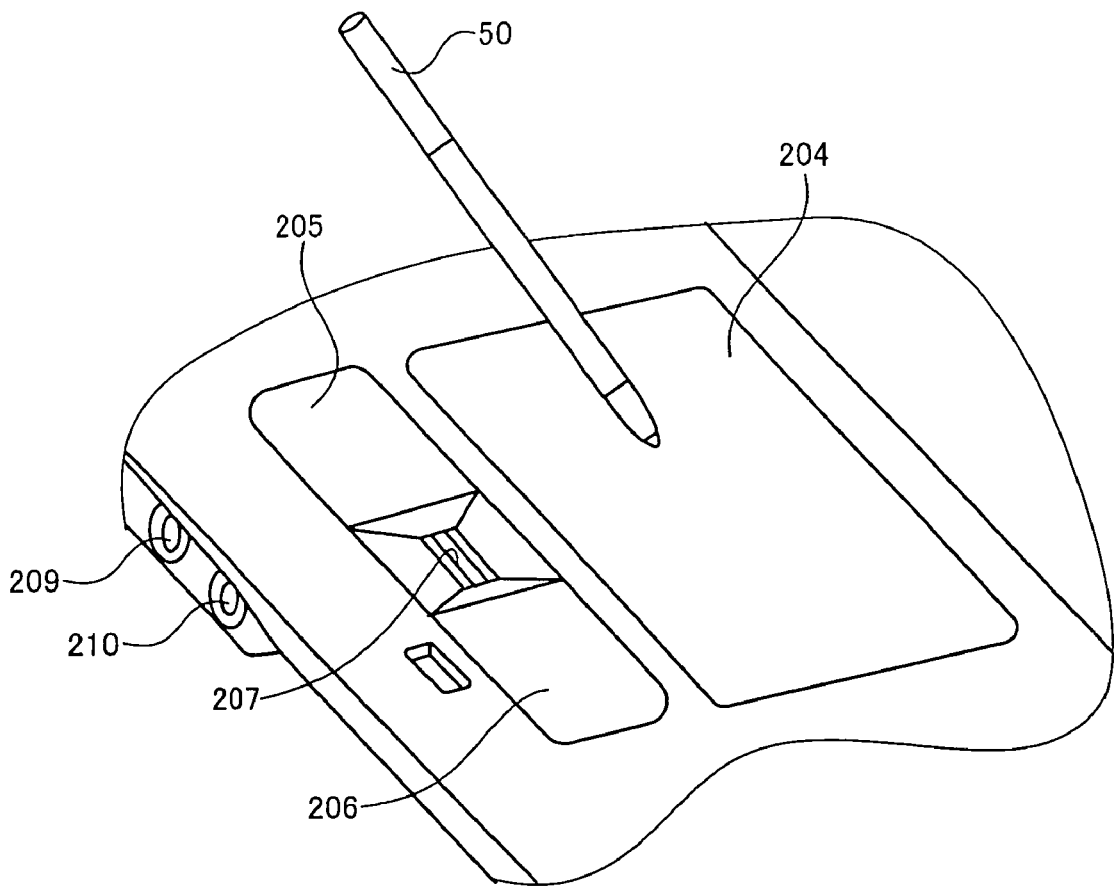
FIG. 5 is a diagram showing a state in which a stylus is in contact with the touchpad.

FIG. 5 is a diagram showing a state in which a stylus 50 is in contact with the touchpad 204.

The stylus 50 has at the tip thereof a built-in resonance circuit composed of coil and capacitor. Resonance occurs in the stylus 50 upon receipt of an electromagnetic force applied from the digitizer 50. The digitizer 403 is configured to detect a position of the tip of the stylus 50 by receiving the resonance. The stylus 50 also has a sensor for detecting a pressure exerted by the tip of the stylus 50 and therefore is capable of returning a modulated signal according to the detected pressure to the digitizer 403 so that the digitizer 403 can also detect the pressure. The stylus 50 may be provided with a push button and configured to return a modulated signal in response to a push of the button to the digitizer 403 so that the digitizer 403 can detect the button being pushed.

The digitizer 403 and the stylus 50 start exchanging electromagnetic signals therebetween when the tip of the stylus 50 is tapped on the touchpad 204. This is possible only when no large metallic body or the like is disposed between a surface of the touchpad 204 and the digitizer 403, which metallic body reduces a large amount of electromagnetic force. For this reason, as shown in FIG. 4, only a single connector 204a and separate wires 204b connected to be used for the connector 204a are disposed in a portion of a board within a detection-effective area where the tip of the stylus 50 can be detected by the digitizer 403. In addition, an LSI 204c, which is a large block and serves as a circuit for controlling the touchpad 204, is disposed in a portion of the board outside the detection-effective area. This layout is provided for the purpose of preventing large reduction of electromagnetic force.

Figure 6:
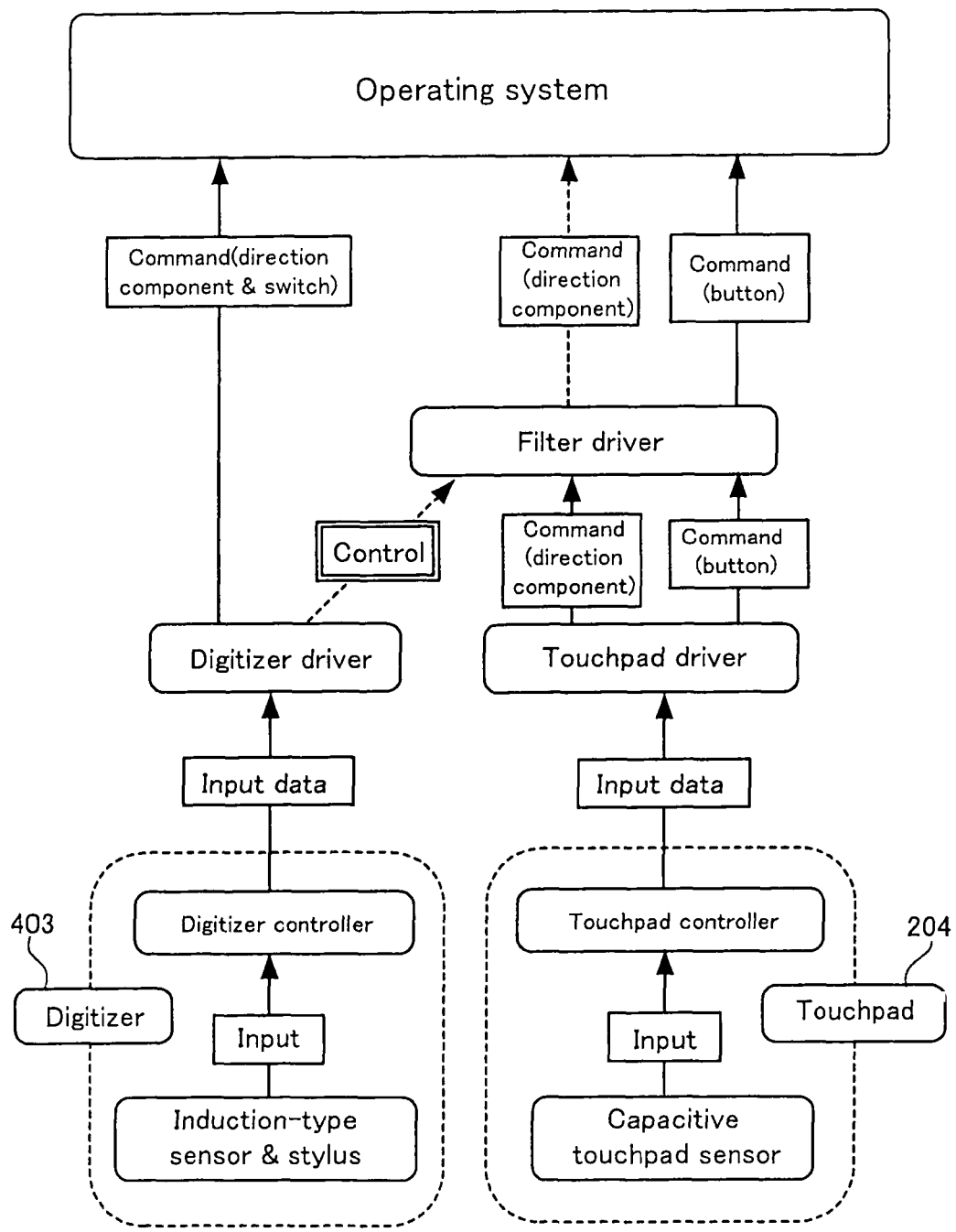
FIG. 6 is a diagram showing the relationship between a digitizer and the touchpad in terms of control.

FIG. 6 is a diagram showing the relationship between the digitizer 403 and the touchpad 204 in terms of control.

The digitizer 403 is provided with an induction-type sensor and the stylus. The digitizer 403 is also provided with a digitizer controller that receives an input signal generated by interaction between the induction-type sensor and the stylus so that the digitizer can detect information such as a position of the tip of the stylus. Data representing the result of the detection is input to a digitizer driver. According to the input data, the digitizer driver generates a direction component representing the direction in which the tip of the stylus has moved and an appropriate command representing a switching operation and the like. Subsequently, the digitizer driver transmits the generated component and the command to an operating system and controls a filter driver that will be described later.

On the other hand, the touchpad 204 includes a capacitive touchpad sensor. The touchpad 204 also includes a touchpad controller that receives an input signal generated by interaction between the touchpad sensor and a finger in response to a touch of the finger on the touchpad 204 so that the touchpad controller can detect a position of the finger. A press of the left-click button 205 and a press of the right-click button 206 shown in FIG. 1 are also detected here. The touchpad controller inputs data according to the result of the detection into a touchpad driver. The touchpad driver transmits a command according to the input data to the filter driver. Commands to be transmitted from the touchpad driver to the filter driver are broadly divided into two types: command representing a direction component generated by a movement of a finger on the touchpad and command representing a press of the left-click button 205 or right-click button 206. According to the control by the digitizer driver, the filter driver transmits only a suitable command out of commands sent from the touchpad driver. Specifically, of a command representing a direction component sent from the touchpad driver and a command representing a button operation, the filter driver prohibits or allows the transmission of the command representing the direction component to the operating system according to the control of the digitizer driver, which will be described below more in detail.

The operating system performs appropriate processing based on a command sent from the digitizer driver and a command sent from the touchpad driver passing through the filter driver.

Figure 7:
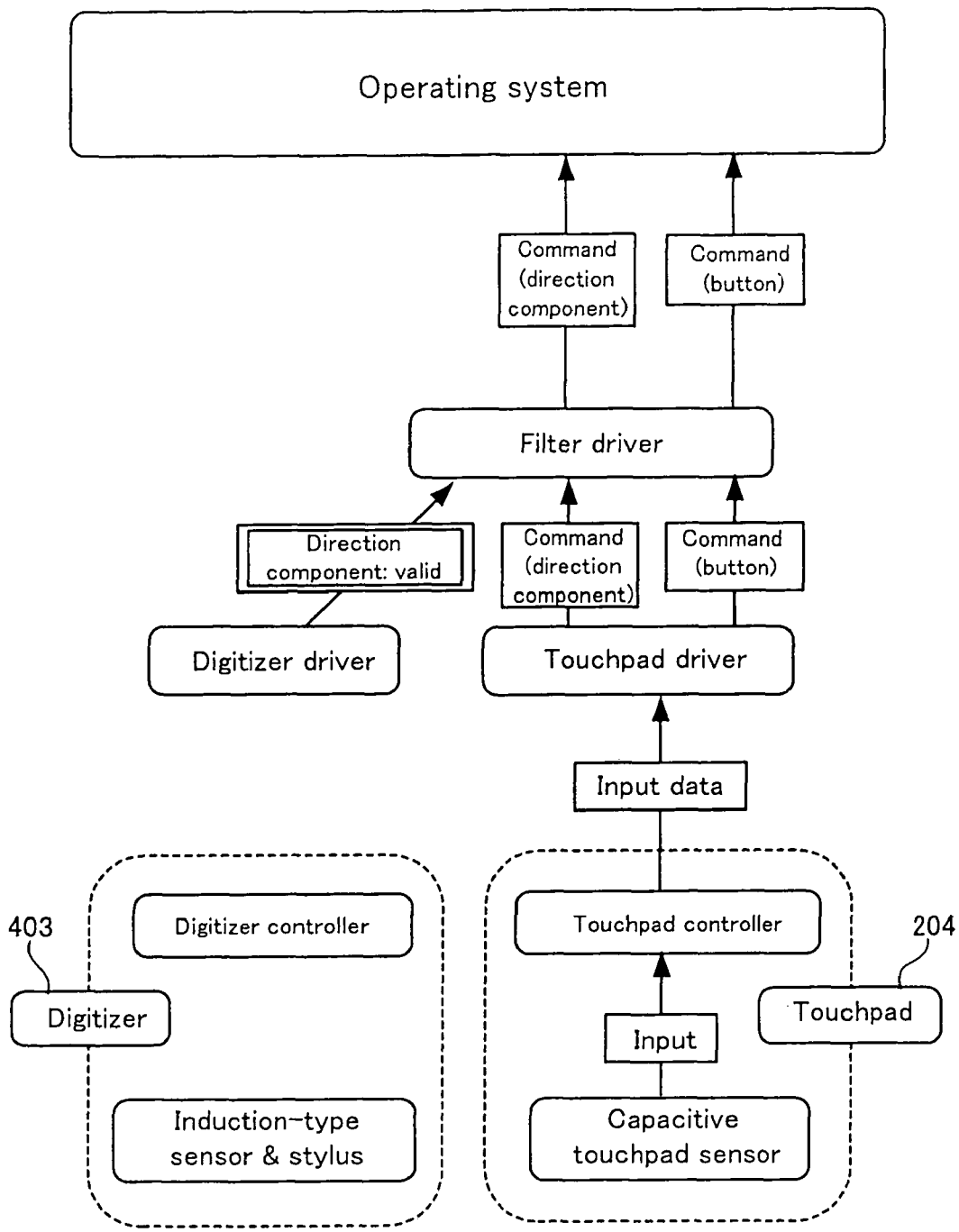
FIG. 7 is another diagram showing the relationship between the digitizer and the touchpad in terms of control.

FIG. 7 is another diagram showing the relationship between the digitizer 403 and the touchpad 204 in terms of control. FIG. 7 shows a state in which the stylus is not in contact with the touchpad 204 and therefore, detection by the digitizer 403 is not performed.

In this case, the digitizer driver controls the filter driver under a condition that a direction component sent from the touchpad driver is also valid. According to the control, the filter driver transmits both a command representing the direction sent from the touchpad driver and a command representing a button operation to the operating system.

Figure 8:
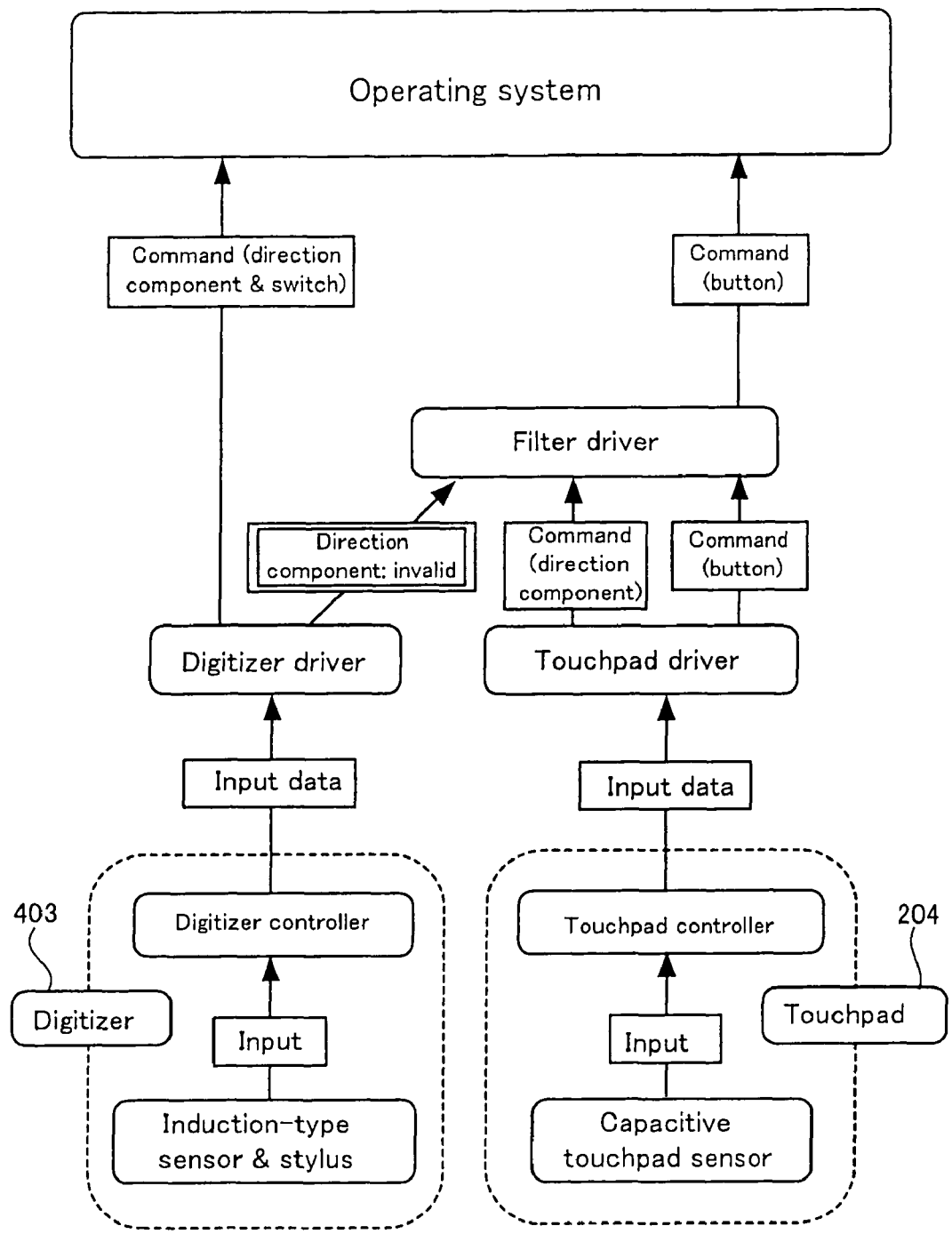
FIG. 8 is another diagram showing the relationship between the digitizer and the touchpad in terms of control.

FIG. 8 is another diagram showing the relationship between the digitizer 403 and the touchpad 204 in terms of control. FIG. 8 shows a state in which detection by the digitizer 403 is performed.

In this case, the digitizer driver transmits a command representing a direction component and an ON/OFF state of a switch of a stylus to the operating system when such a stylus is used, and also controls the filter driver under a condition that the direction component from the touchpad driver is invalid. According to the control, the filter driver prohibits the command representing the direction component of the moved finger from being transmitted to the operating system even when the command representing the direction component of the moved finger is sent from the touchpad driver. At the same time, the filter driver transmits to the operating system only a command representing a press of the left-click button 205 or right-click button 206 sent from the touchpad driver.

In this way, the control by the digitizer 403 and the control by the touchpad 204 can be adjusted to prevent a conflict therebetween even if a hand holding the stylus is brought into contact with the touchpad. Also, such a way of control prevents operation errors from occurring in the touchpad during input operation using the stylus.

Figure 9:
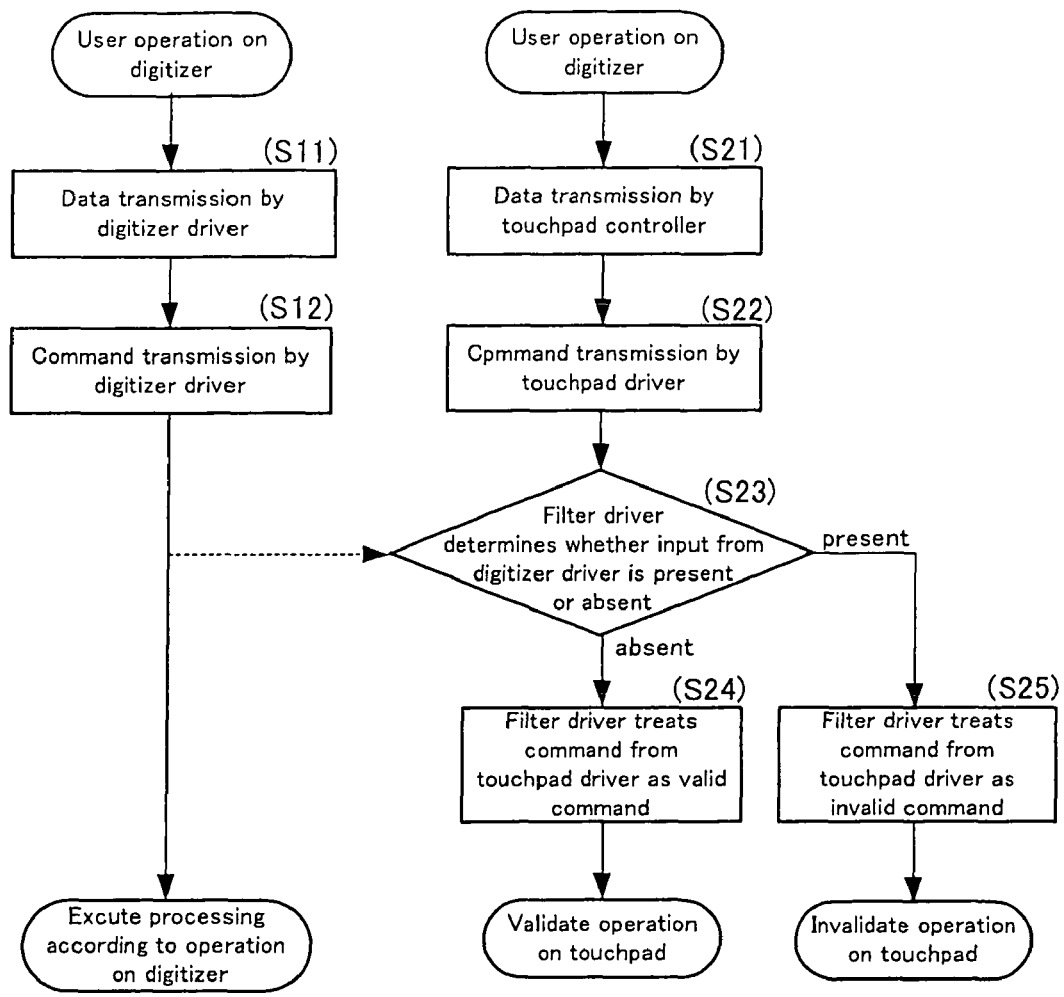
FIG. 9 is a flowchart showing a process for avoiding a conflict between detection by the digitizer and detection by the touchpad.

FIG. 9 is a flowchart showing a process for avoiding a conflict between detection by the digitizer and detection by the touchpad.

The process shown in FIG. 9 will be briefly described below since it has been already described with reference to FIGS. 6 through 8.

In response to user operation on the digitizer, the digitizer controller transmits data to the digitizer driver (step S11). Upon receipt of the data, the digitizer driver transmits a command (step S12) and subsequently, processing according to the user operation on the digitizer is performed through the operating system.

On the other hand, in response to user operation on the touchpad, the touchpad controller transmits data to the touchpad driver (step S21). Upon receipt of the data, the touchpad driver transmits a command to the filter driver (step S22). The filter driver determines whether input from the digitizer driver is present or absent (step S23). The filter driver treats the command from the touchpad driver as a valid command when input from the digitizer driver is absent (step S24). Subsequently, processing according to the user operation on the touchpad is performed through the operating system. However, when input from the digitizer driver is present (step S24), the filter driver treats the command from the touchpad driver as invalid and treats only a command representing the left-click button 205 or right-click button 206 as valid for the touchpad (step S25).

As described above, the embodiment employs such a structure that the touchpad is overlaid on the digitizer, which allows the touchpad and the digitizer to share a common space thereby saving more space than a case without such an overlaid structure.

Further, the overlaid structure according to the embodiment enables a user to perform seamless operation by using both a hand and a stylus. For example, the user can carry out operation with the stylus while still holding the style, immediately after operation with the stylus. Therefore, the overlaid structure of the embodiment has improved operability further than a case without such an overlaid structure or a case with a display screen overlaid on a digitizer.

Furthermore, the overlaid structure according to the embodiment makes a user to readily notice that the touchpad and the digitizer cannot be used at the same time.

In addition, the embodiment employs such a structure that the touchpad and the digitizer are disposed approximately at the center in the width direction of the notebook PC 10, which allows both right-handed users and left-handed users to readily operate the touchpad and the digitizer.

3. Security Lock Hole and USB Connector

Figure 10:
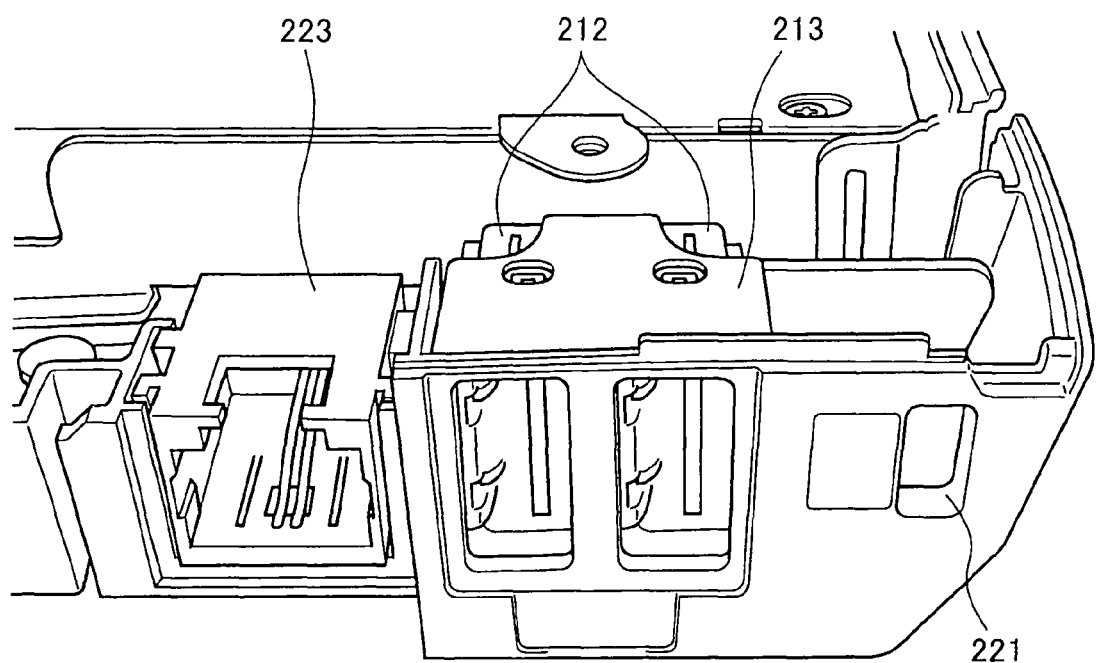
FIG. 10 is a perspective view showing a corner of the rear end surface of the main unit, which corner is in the hinge section side.

FIG. 10 is a perspective view showing a corner of the rear end surface of the main unit 20, which corner is in the hinge section side. The main unit 20 shown in FIG. 1 has a housing composed of a top cover and a bottom cover. FIG. 10 shows the bottom cover and the inside thereof with the top cover being removed.

As shown in FIG. 10, a security lock hole 221 is formed in the bottom cover at a position closest to the corner. In addition, two USB connectors 212 are disposed side by side adjacent to the security lock hole 221, and a modem connector 223 is disposed adjacent to the security lock hole 221. All these connectors are amounted on the motherboard.

When an external connector 501 (see FIG. 12) capable of being mated with either one of the two USB connectors 212 is inserted into or removed therefrom, a force in a lateral direction is applied to the mated one of the two USB connectors 212. In order to sufficiently withstand the force, the two USB connectors 212 are supported by a support fitting 213.

The security lock hole 221 is a hole used for securing a locking device that restricts movements of the notebook PC 10. The locking device is provided with a key section. Once the key section is inserted into the security lock hole 221, the key section cannot be removed therefrom as it becomes large inside the security lock hole 221. In this way, the movement of the notebook PC 10 can be restricted.

Figure 11:
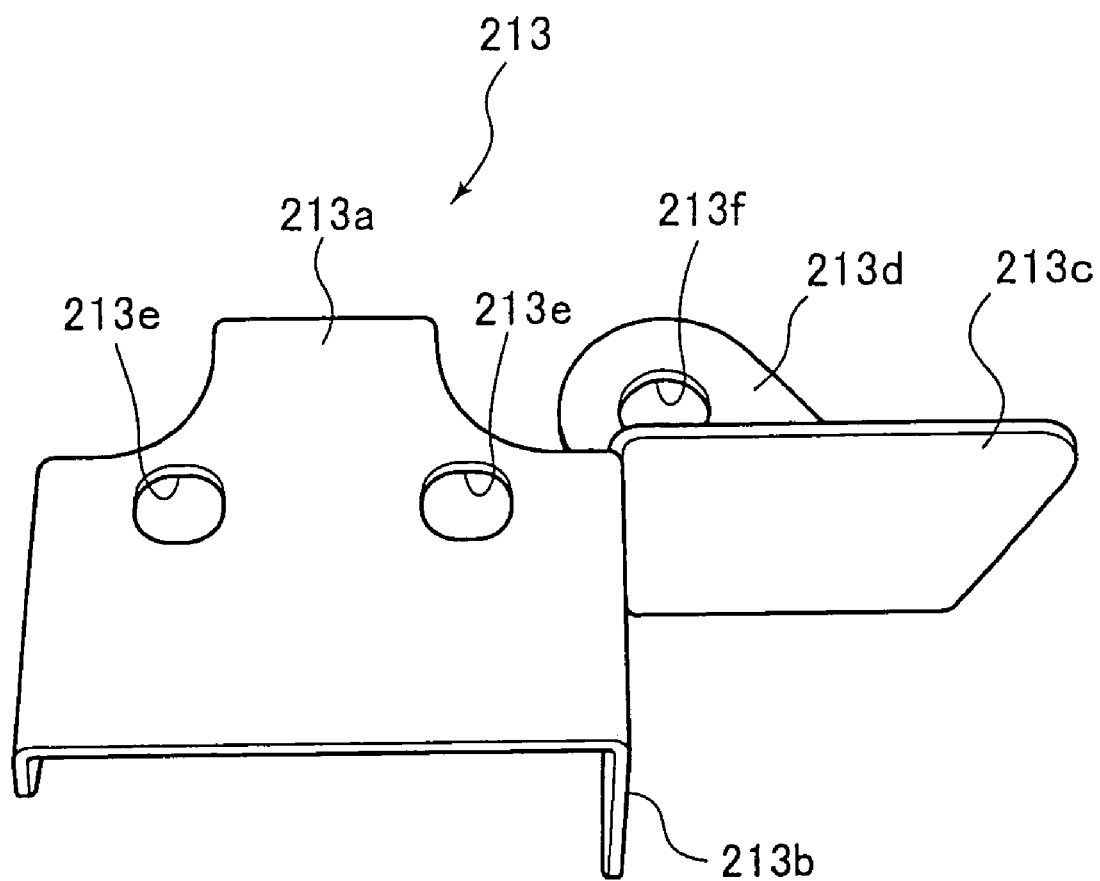
FIG. 11 is a perspective view of a support fitting.

FIG. 11 is a perspective view of the support fitting 213.

The support fitting 213 has a pressure plate 213*a* for pressing and holding the two USB connectors 212, two divider walls 213*b* and 213*c* and a screw-fastened plate 213*d*. The pressure plate 213*a* has two holes 213*e*, and the screw-fastened plate 213*d* has a screw hole 213*f*.

Figure 12:
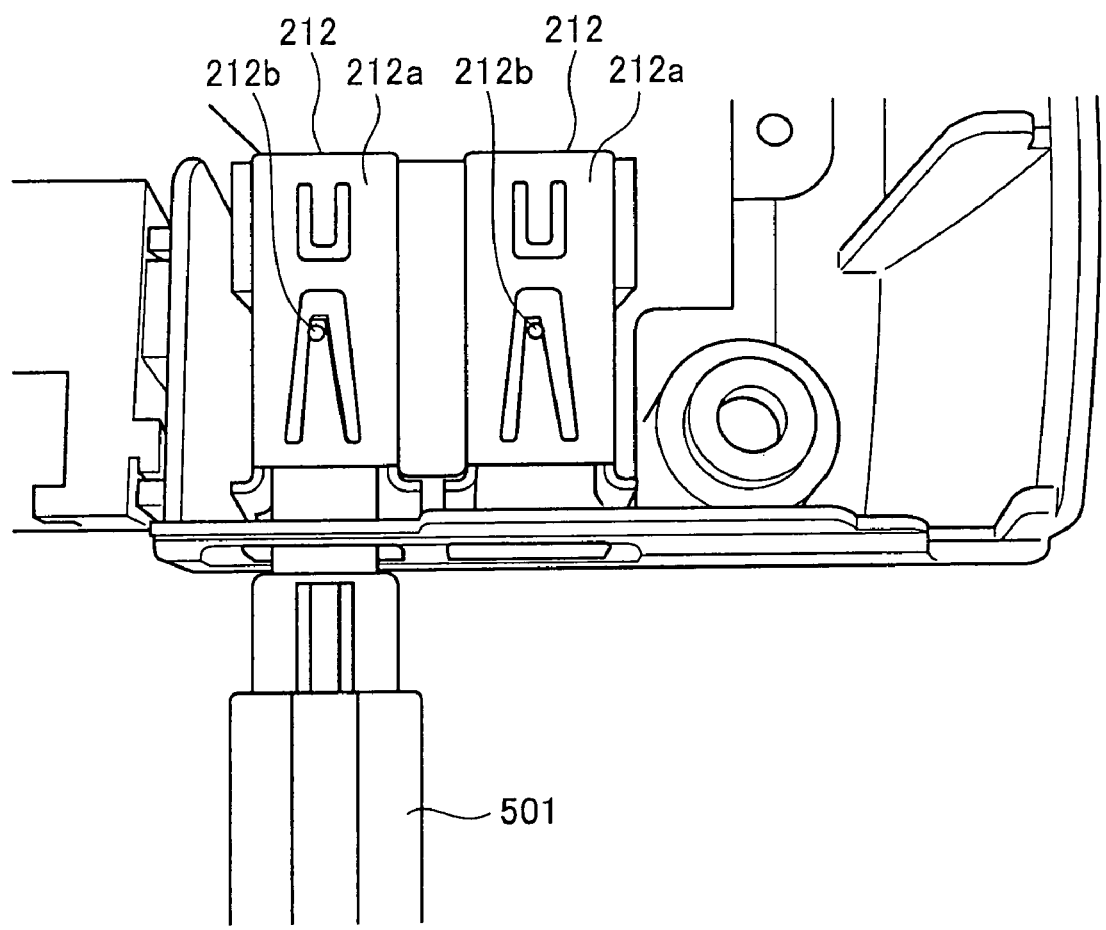
FIG. 12 is a plan view of the same portion shown in FIG. 10 with the support fitting being removed.

FIG. 12 is a plan view of the same portion shown in FIG. 10 with the support fitting 213 being removed.

The pressure plate 213*a* of the support fitting 213 shown in FIG. 11 serves to press and hold top surfaces 212*a* of the respective two USB connectors 212 so that these USB connectors 212 can withstand a force that may be accidentally applied thereto. Meanwhile, the top surfaces of the USB connectors 212 each have a projection 212*b* that remains in a position lower than the top surface of the external connector 501 when the external connector 501 is removed therefrom, and projects above the top surface of the external connector 501 when the external connector 501 is inserted therein.

As shown in FIG. 12, the two USB connectors 212 are disposed adjacent to each other such that the top surfaces 212*a* thereof become flush with each other. The pressure plate 213*a* of the support fitting 213 shown in FIG. 11 serves to press and hold the top surfaces 212*a* being flush with each other. The two holes 213*e* of the pressure plate 213*a* each serve as an escape section by receiving the projection 212*b* of any of the USB connectors 212 when it projects.

Depending on size of the external connector 501, the projection 212*b* may project greatly or slightly above the top surface 212*a* when the external connector 501 is inserted. However, since the two holes 213*e* of the pressure plate 213*a* are formed to serve as an escape section, the external connector 501 in any size can be readily inserted or removed and the two USB connectors 212 can be sufficiently secured in a simple structure.

Figure 13:
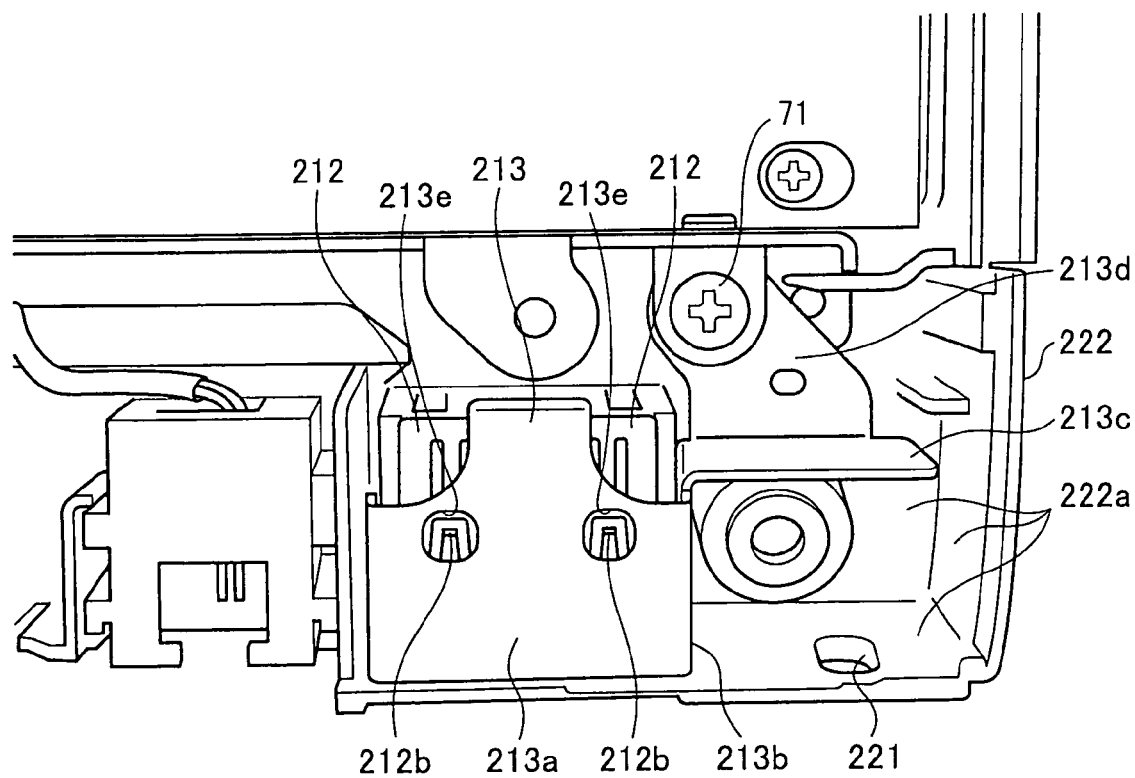
FIG. 13 is a perspective view of the same portion shown in FIG. 10 with the support fitting being attached thereto, as viewed obliquely from above.

FIG. 13 is a perspective view of the same portion shown in FIG. 10 with the support fitting 213 being attached thereto, as viewed obliquely from above so that the back of the security lock hole 221 becomes visible.

The support fitting 213 is fixed on the bottom cover 222 by a screw 71.

In the state when the support fitting 213 is thus fixed, the divider walls 213*b* and 213*c* of the support fitting 213 serve as two walls defining a space around the security lock hole 221 in the inside of the housing formed by the bottom cover 222 and the top cover (not shown). The divider walls 213*b* and 213*c* define the space in cooperation with inner walls 222*a* of the bottom cover 222 and inner walls of the top cover.

The security lock hole 221 is formed for locking. However, many users provide their notebook PCs with no locking device. In this case, if the space around the security lock hole 221 is not demarcated, dust will enter and settle in the inside of the housing thereby preventing air cooling or causing a short in a circuit resulting in malfunction. Therefore, the embodiment is configured to demarcate the space around the security lock hole 221 with the support fitting 213 for supporting the USB connectors 212, which makes it possible to prevent dust from entering the inside of the housing without increasing the number of components.

Figure 14:
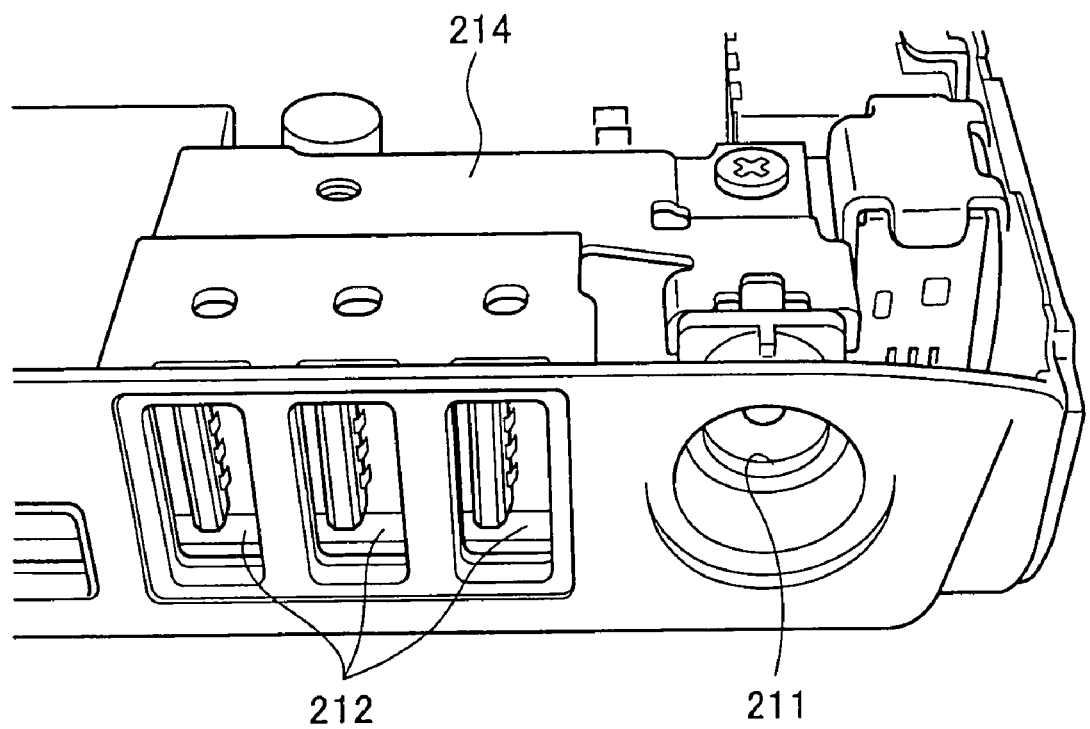
FIG. 14 is a perspective view showing one corner of the right flank of the main unit, which corner is in the hinge section side and is also shown in FIG. 1.

FIG. 14 is a perspective view showing one corner of the right flank of the main unit 20, which corner is in the hinge section side and is also shown in FIG. 1. FIG. 14 shows the bottom cover and the inside thereof with the top cover being removed.

FIG. 14 also shows the DC power connection terminal 211 and the three USB connectors 212 shown in FIG. 1. These USB connectors 212 are disposed such that the top surfaces thereof become flush with one another.

The DC power connection terminal 211 and the three USB connectors 212 are supported by a support fitting 214.

Figure 15:
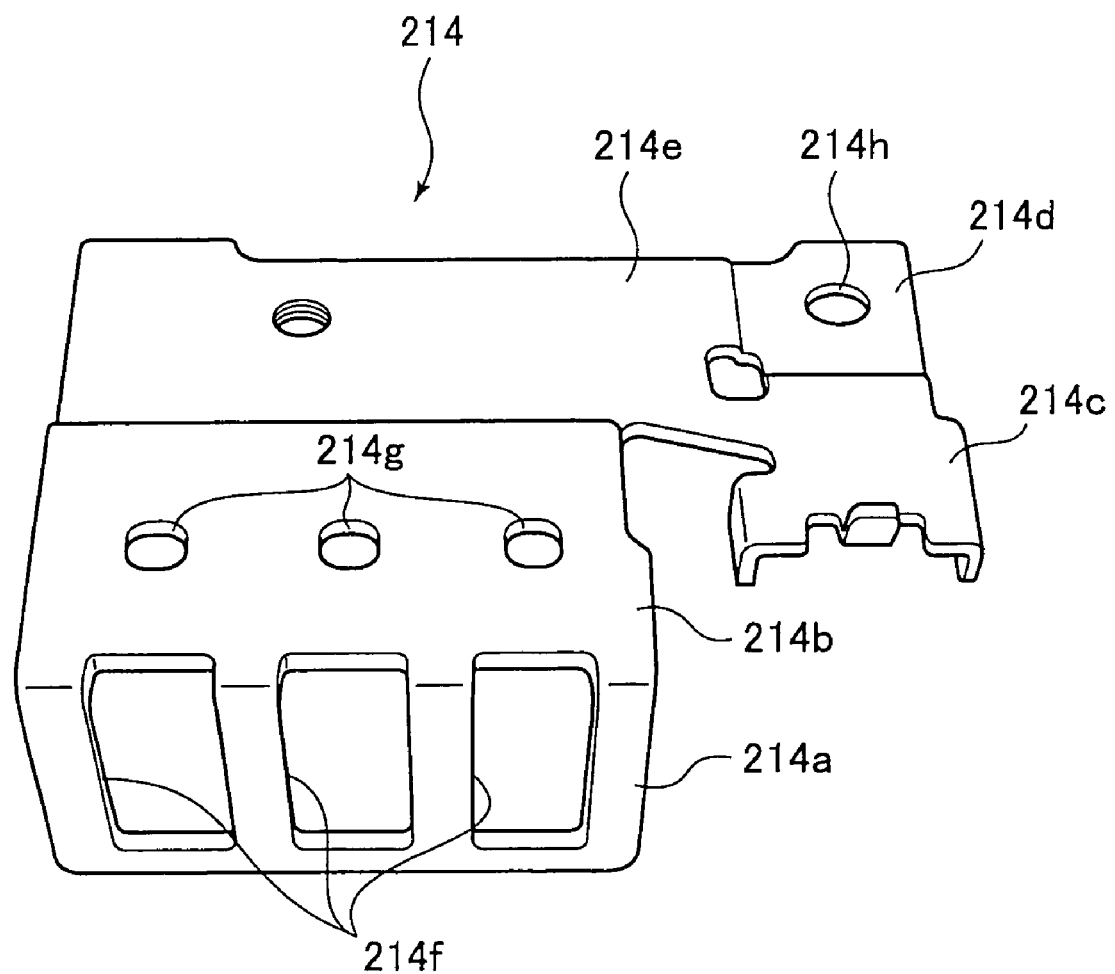
FIG. 15 is a perspective view of a support fitting.

FIG. 15 is a perspective view of the support fitting 214.

The support fitting 214 has a front wall 214*a*, a pressure plate 214*b*, a terminal-retaining plate 214*c*, a screw-fastened section 214*d* and a link section 214*e*. The front wall 214*a* has openings 214*f* for the USB connectors 212. The pressure plate 214*b* has three holes 214*g* serving as escape sections by receiving three projections 212*b* (see FIG. 16) of the respective USB connectors 212 and serves to press and hold the top surfaces of the USB connectors 212. The terminal-retaining plate 214*c* serves to press and hold the DC power connection terminal 211. The screw-fastened section 214*d* has a hole 214*h* used for screw fastening. The link section 214*e* serves to link the pressure plate 214*b*, the terminal-retaining plate 214*c* and the screw-fastened section 214*d*.

Figure 16:
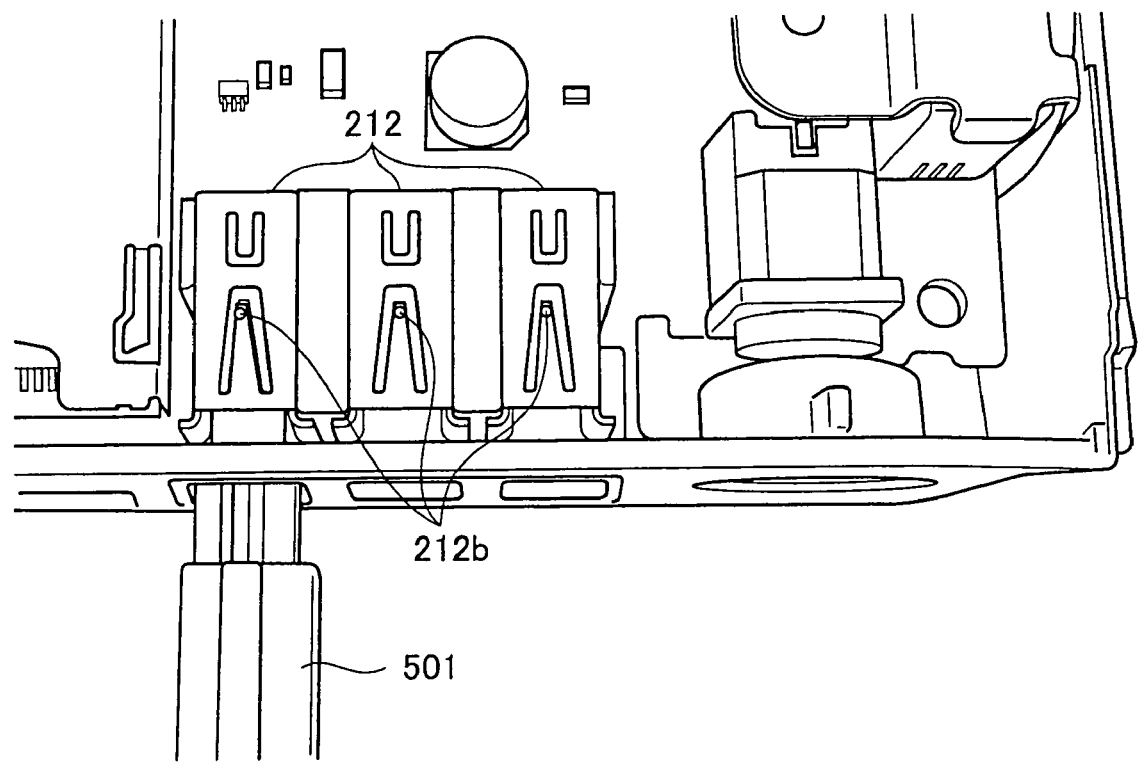
FIG. 16 is a plan view of the same portion shown in FIG. 14 with the support fitting shown in FIG. 15 being removed.
Figure 17:
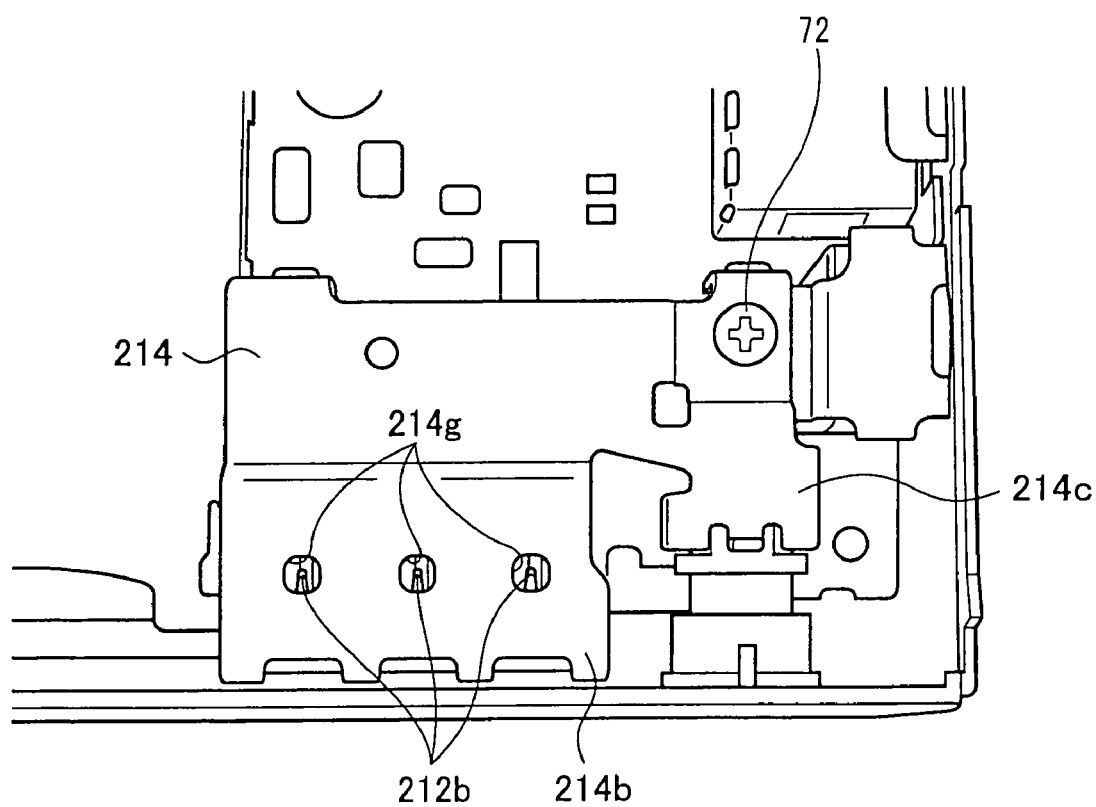
FIG. 17 is a plan view of the same portion shown in FIGS. 14 and 16 with the support fitting being attached thereto.

FIG. 16 is a plan view of the same portion shown in FIG. 14 with the support fitting 214 being removed. FIG. 17 is a plan view of the same portion shown in FIGS. 14 and 16 with the support fitting 214 being attached thereto.

The support fitting 214 is fixed to the bottom cover with a screw 72.

As described above, the three USB connectors 212 have the respective projections 212*b*. Each of the projections 212*b* remain in a position lower than the top surface of an external connector 501 when the external connector 501 is removed therefrom, and projects above the top surface of the external connector 501 when the external connector 501 is inserted therein.

The pressure plate 214b of the support fitting 214 shown in FIG. 15 has three holes 214g each serving as an escape section by accepting the corresponding one of the projections 212b of the three USB connectors 212. Because such an escape section (hole 214g) is provided, the external connector 501 in any size can be readily inserted or removed and the three USB connectors 212 can be securely fixed. In addition, the support fitting 214 alone can simultaneously support both the DC power connection terminal 211 and the three USB connectors 212 as shown in FIG. 17.

4. Hard Disk Structure

Figure 18:
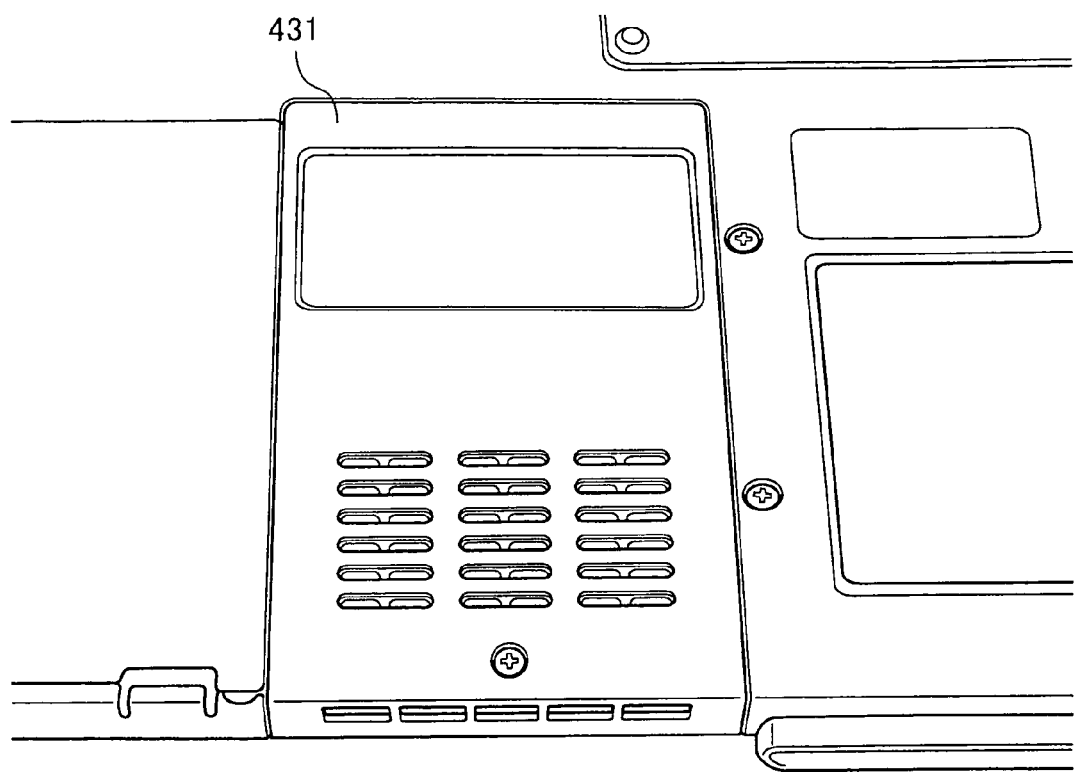
FIG. 18 is a diagram showing a part of the bottom surface of the main unit.
Figure 19:
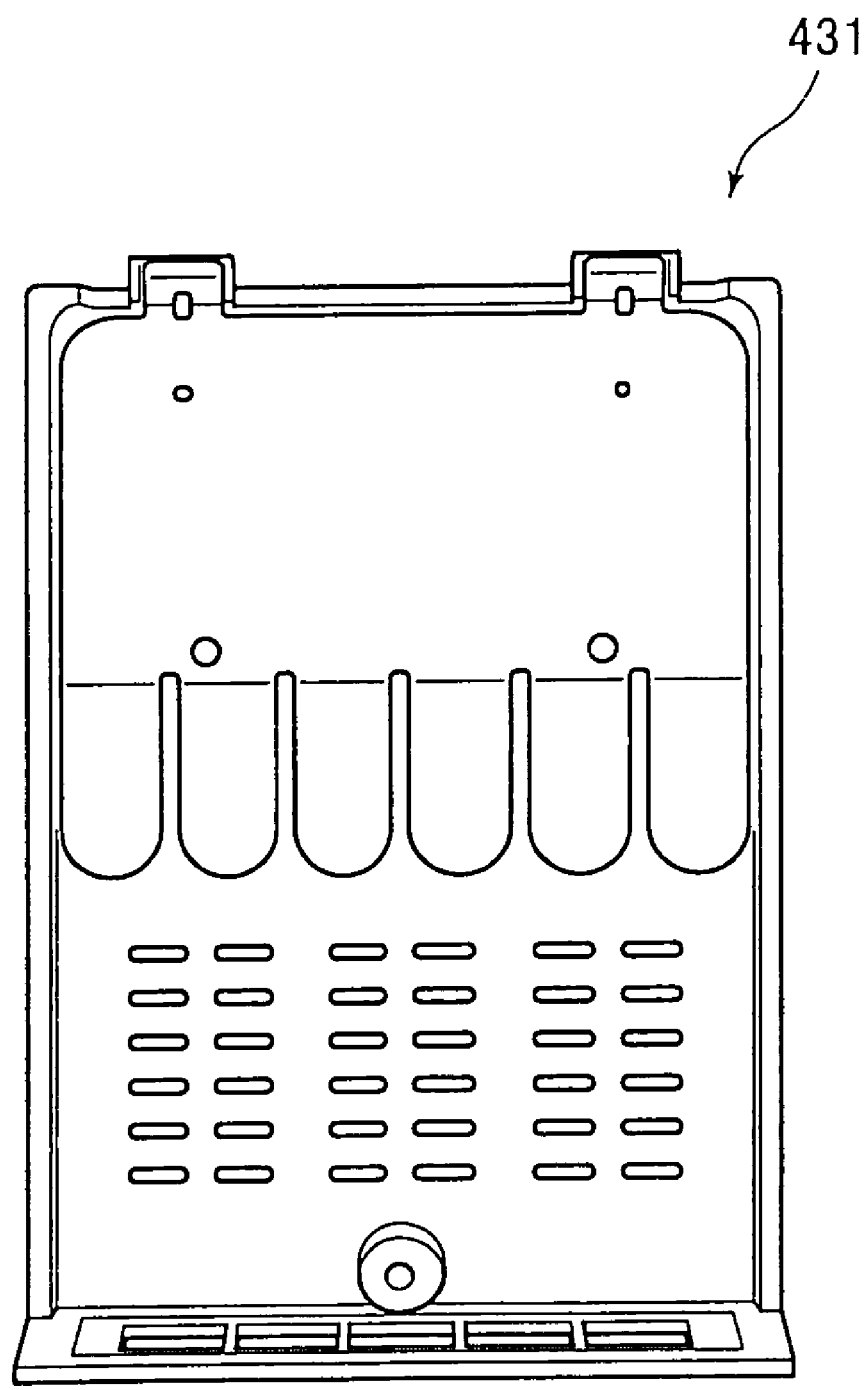
FIG. 19 is a diagram showing an inner surface of a lid provided on the bottom surface.

FIG. 18 is a diagram showing a part of the bottom surface of the main unit 20, and FIG. 19 is a diagram showing an inner surface of a lid 431 provided on the bottom surface.

FIGS. 18 and 19 both show the lid 431 for covering a portion where a hard disk assembly is disposed. The lid 431 forms a part of the bottom cover of the main unit 20 and is removably attached thereto.

Figure 20:
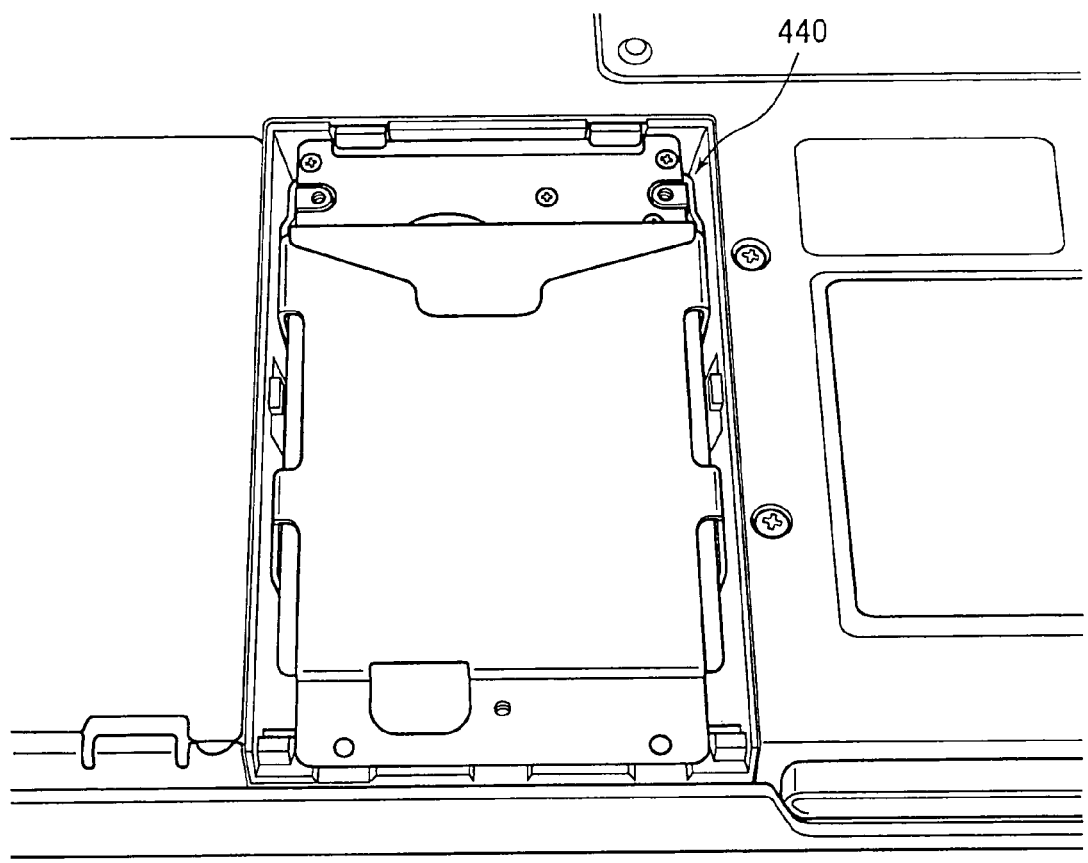
FIG. 20 is a diagram showing the same portion shown in FIG. 18 with the lid being removed.

FIG. 20 is a diagram showing the same portion shown in FIG. 18 with the lid 431 being removed.

In this portion, a hard disk assembly 440 is disposed. The hard disk assembly 440 is a unit including a hard disk drive 441. The hard disk drive 441 contains a hard disk serving as a large-capacity storage medium, and reads and writes information from and onto the hard disk while rotating the disk.

Figure 21:
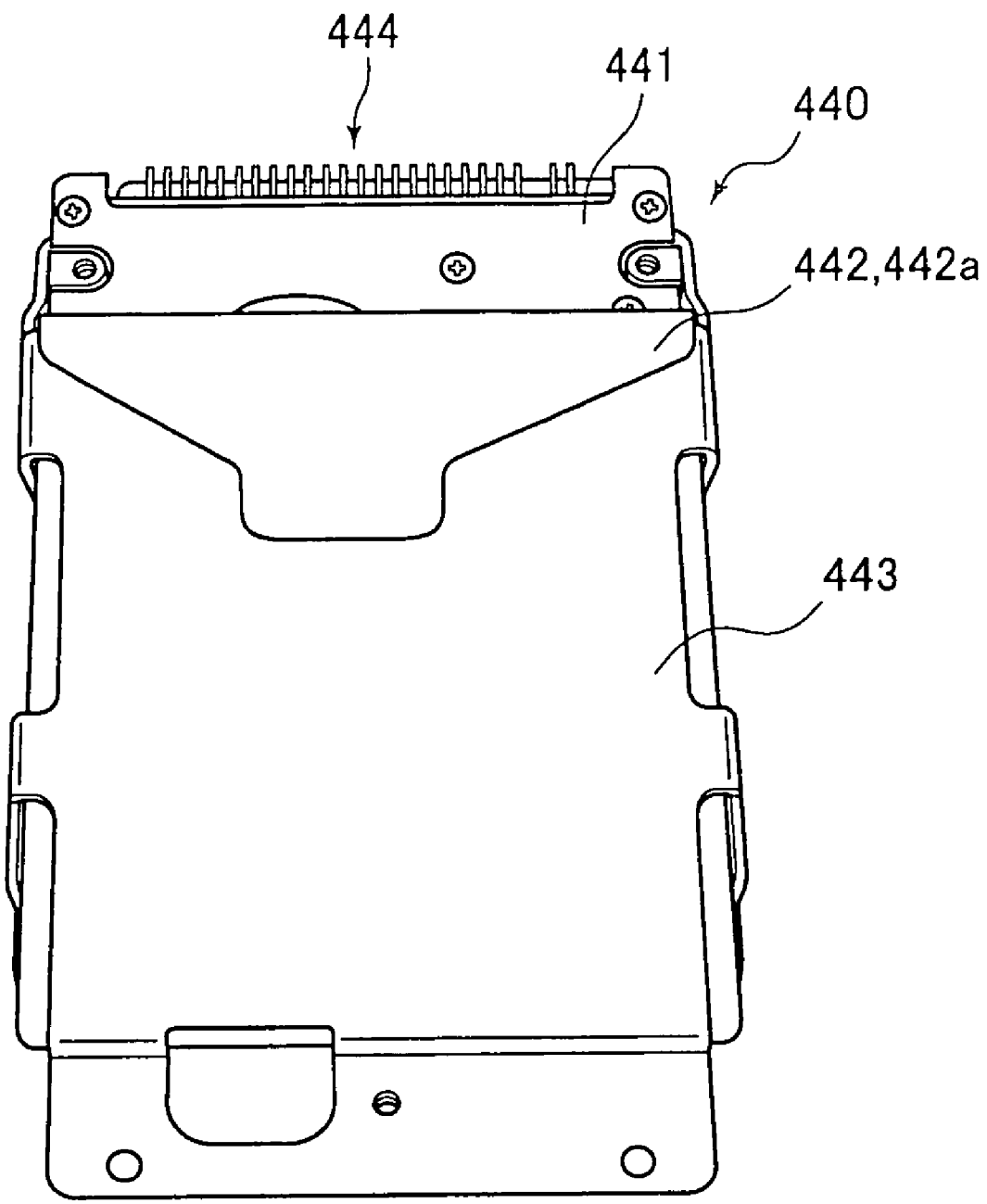
FIG. 21 is a diagram showing a hard disk assembly.

FIG. 21 is a diagram showing the hard disk assembly 440 alone.

FIG. 21 shows the hard disk drive 441 and an insulating sheet 442 that covers the top of a circuit board of the hard disk drive 441. Only a flange section 442a of the insulating sheet 442 is shown in FIG. 21, which will be described later. FIG. 21 also shows a support fitting 443 for increasing the strength of the hard disk drive 441 and used for attaching the hard disk drive 441 to the main unit 20. Further, FIG. 21 shows a connector 444 fixed at one end of the circuit board of the hard disk drive 441 and used for electrical connection with a connector mounted on the motherboard in the main unit 20.

Figure 22:
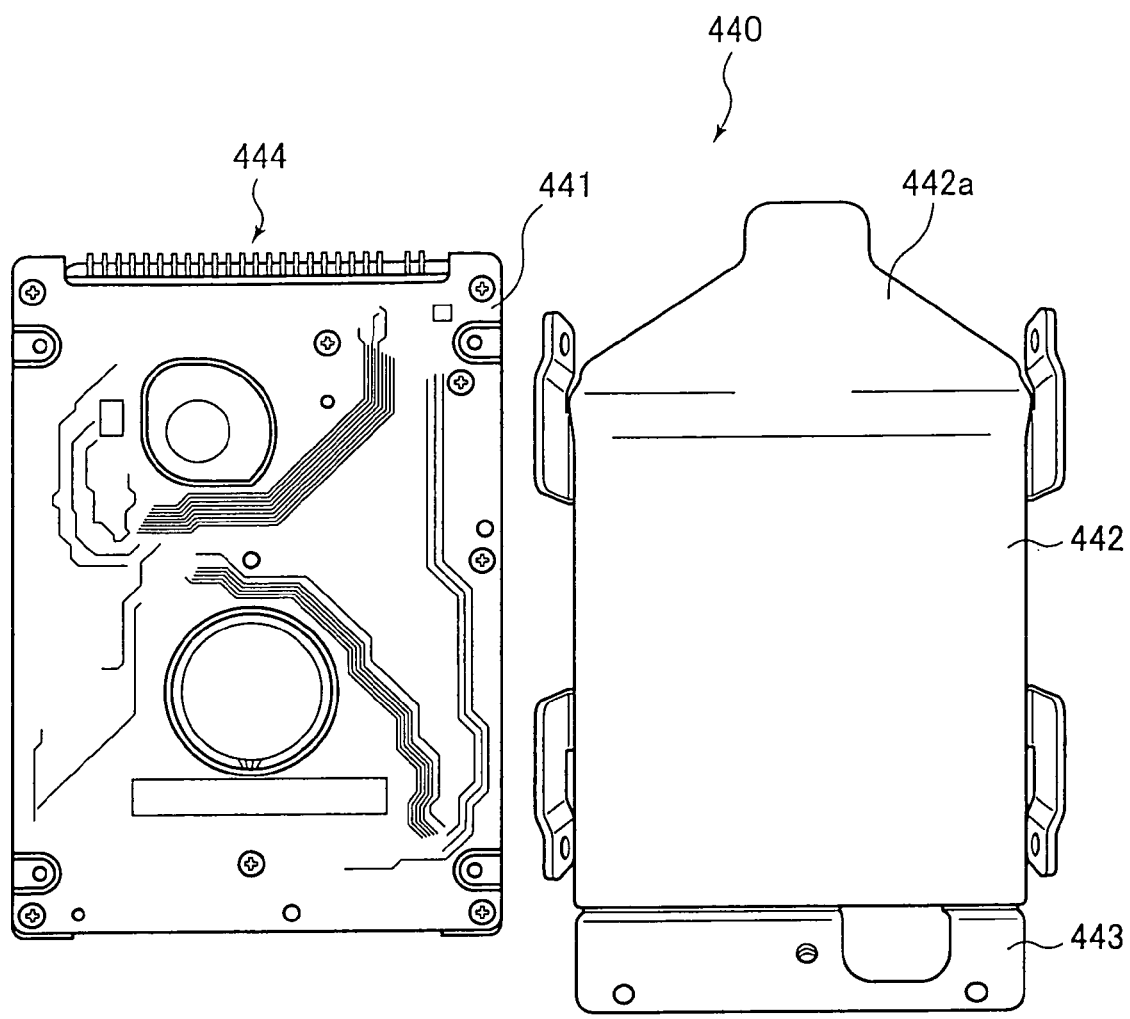
FIG. 22 is a diagram showing the hard disk assembly, in which a hard disk drive and a support fitting are separately shown.

FIG. 22 is a diagram showing the hard disk assembly 440, in which the hard disk drive 441 and the support fitting 443 with the insulating sheet 442 attached thereto are separately shown. FIG. 22 shows a surface of the support fitting 443 (a surface of the insulating sheet 442) to be in contact with the circuit board of the hard disk drive 441.

The support fitting 443 is a conductive metal plate component. Therefore, if the support fitting 443 is directly disposed on the circuit board, the support fitting 443 will cause a short in a circuit on the circuit board resulting in a malfunction. For this reason, the support fitting 443 is laid on the hard disk drive 441 with the insulating sheet 442 interposed therebetween.

The insulating sheet 442 serves to keep insulation between the hard disk drive 441 and the support fitting 443 and has the flange section 442a. As shown in FIG. 21, the flange section 442a is a portion spread on the back surface of the support fitting 443 from an edge in the connector 444 side.

As shown in FIG. 21, the flange section 442a has such a shape that a central portion thereof is broader than portions closer to both ends of the edge where the flange section 442a is exposed.

Figure 23:
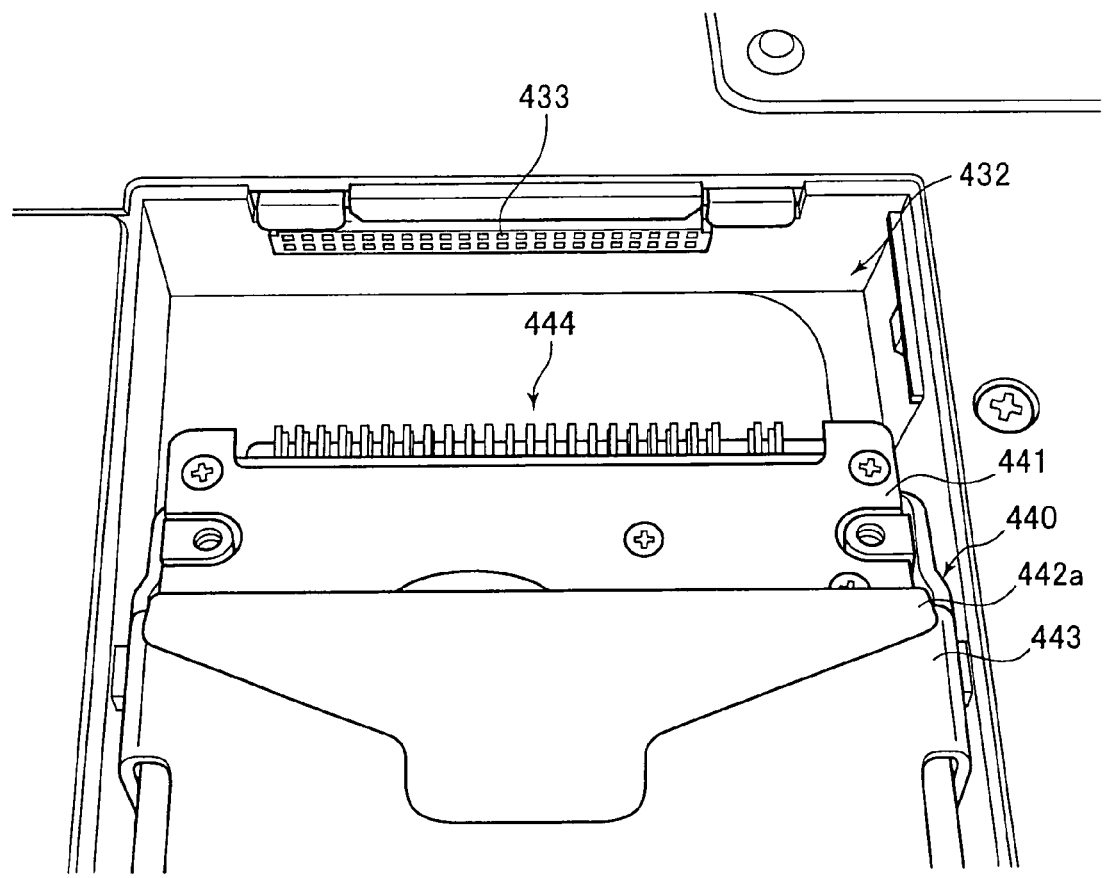
FIG. 23 is a diagram showing the inside of a portion for accommodating the hard disk assembly with the lid being removed and the hard disk assembly being shifted to be removed.

FIG. 23 is a diagram showing the inside of a portion for accommodating the hard disk assembly 440 with the lid 431 being removed and the hard disk assembly 440 being shifted to be removed.

FIG. 23 illustrates the inside of a part of the main unit 20, where an opening 432 to be covered by the lid 431 is formed. The hard disk assembly 440 is disposed inside the opening 432 and a connector 433 is disposed adjacent to the opening 432 to be mated with the connector 444 of the hard disk drive 441. By pulling the flange section 442a of the insulating sheet 442 in the state when the connectors 433 and 444 are mated with each other, the connector 444 of the hard disk drive 441 can be disconnected from the connector 433 of the main unit 20 and thereby the hard disk drive 441 can be removed.

As described above, the central portion of the flange section 442a is broader and is usually held by a user while being pulled. Therefore, a force is uniformly applied to the connector 444 in the lateral direction and it is possible to prevent excessive force from being applied in a slating direction.

The opening 432 has space barely enough for the hard disk assembly 440. However, the flange section 442a is formed by extending a part of the insulation sheet 442 so that the hard disk assembly 440 can be removed by pulling the flange section 442a, thereby improving operability when such removal is necessary. The flange section 442a is an extension of the insulation sheet 442. The insulation sheet 442 is an essential element and therefore, there is no need to provide an additional component to be used as a pull. Besides, because the insulation sheet 442 is a thin material, there is no need to provide extra space for a pull.

5. Wiring Structure Outside Hinge Section

Figure 24:
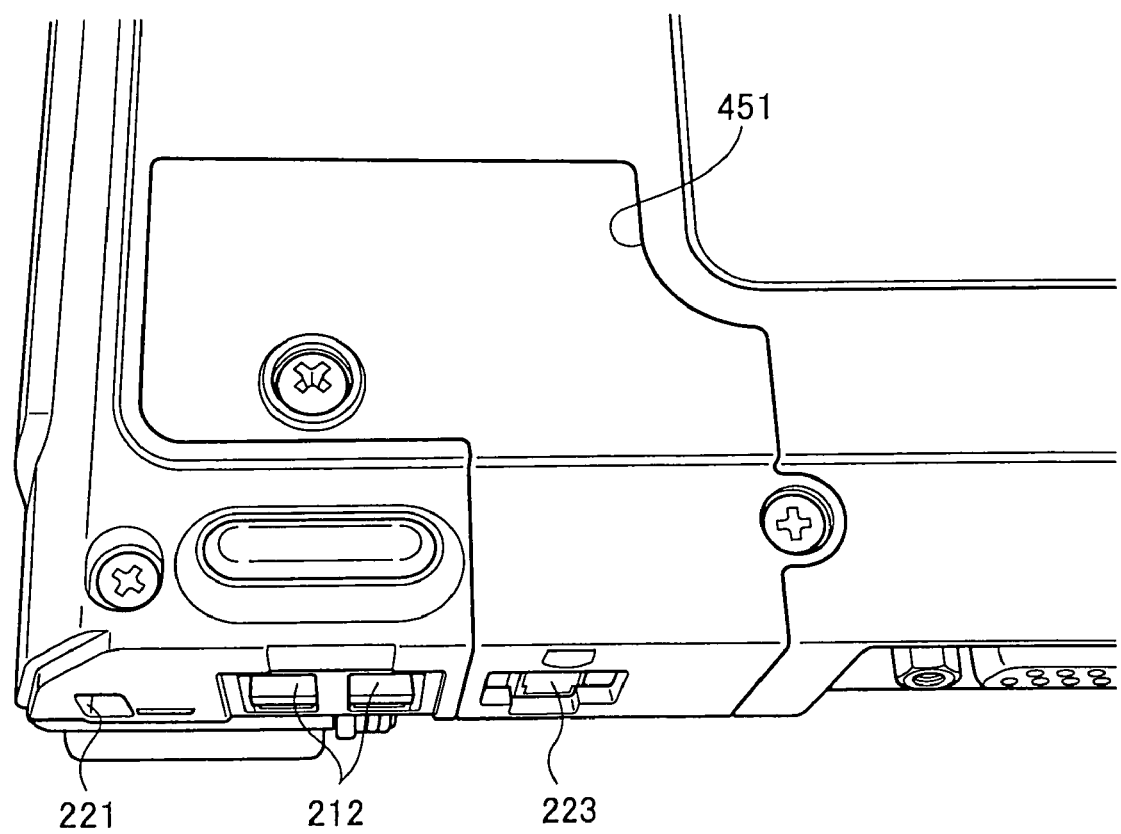
FIG. 24 is a perspective view showing a corner of the rear end surface of the main unit, which corner is in the hinge section side, as viewed from the bottom of the main unit.

FIG. 24 is a perspective view showing a corner of the rear end surface of the main unit 20, which corner is in the hinge section side, as viewed from the bottom of the main unit 20.

FIG. 24 illustrates the security lock hole 221 and the two USB connectors 212 which are also shown in FIG. 13. Because FIG. 24 is a view seen from the bottom of the main unit 20, the security lock hole 221 and the two USB connectors 212 are aligned in a direction opposite to that in FIG. 13. Next to these USB connectors 212, the modem connector 223 is disposed. FIG. 24 also shows a removably attachable lid 451.

Figure 25:
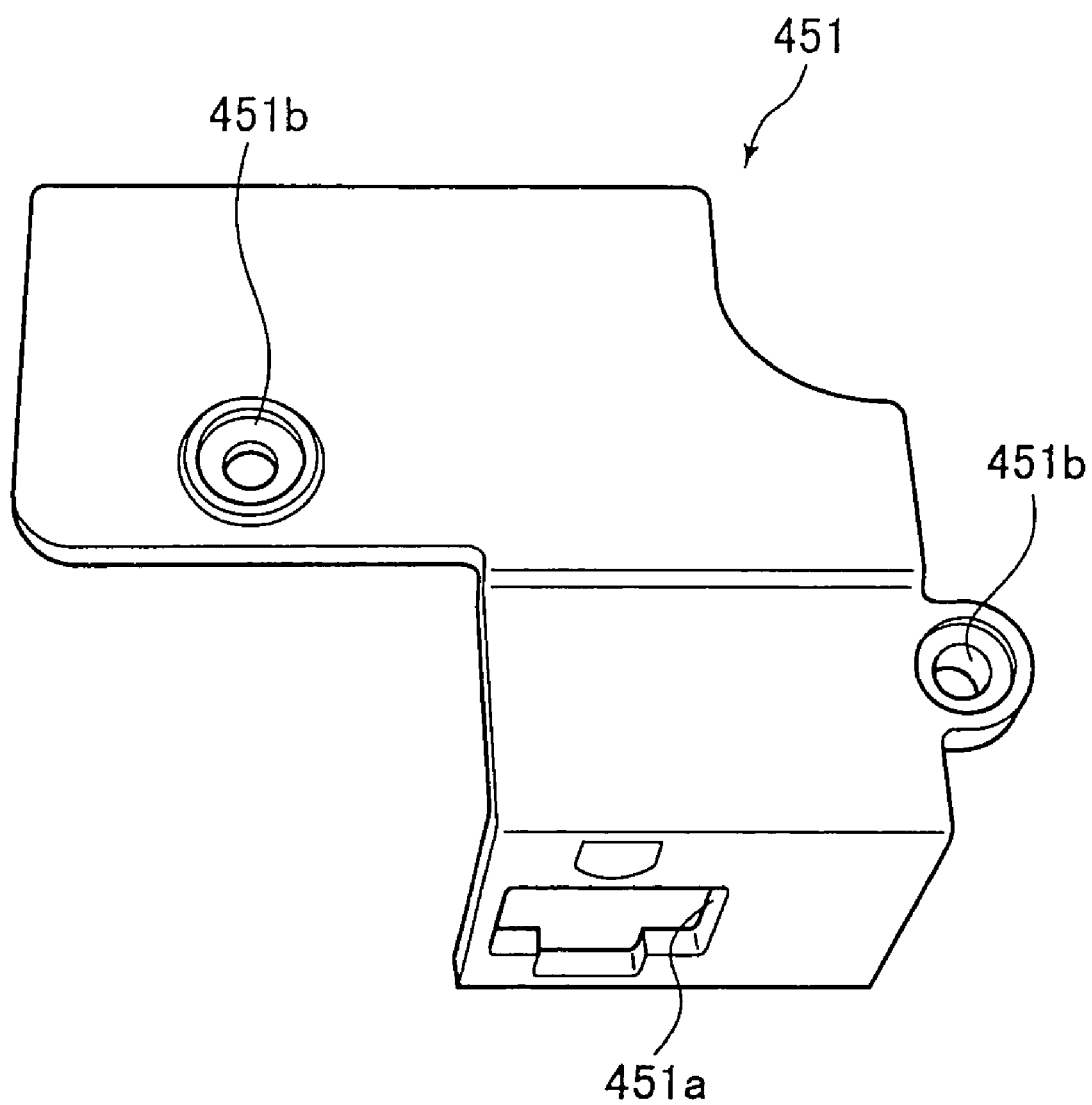
FIG. 25 is a diagram showing a lid shown in FIG. 24 alone.

FIG. 25 is a diagram showing the lid 451 alone.

The lid 451 has an opening 451a for the modem connector 223 shown in FIG. 24 and two screw holes 451b.

Figure 26:
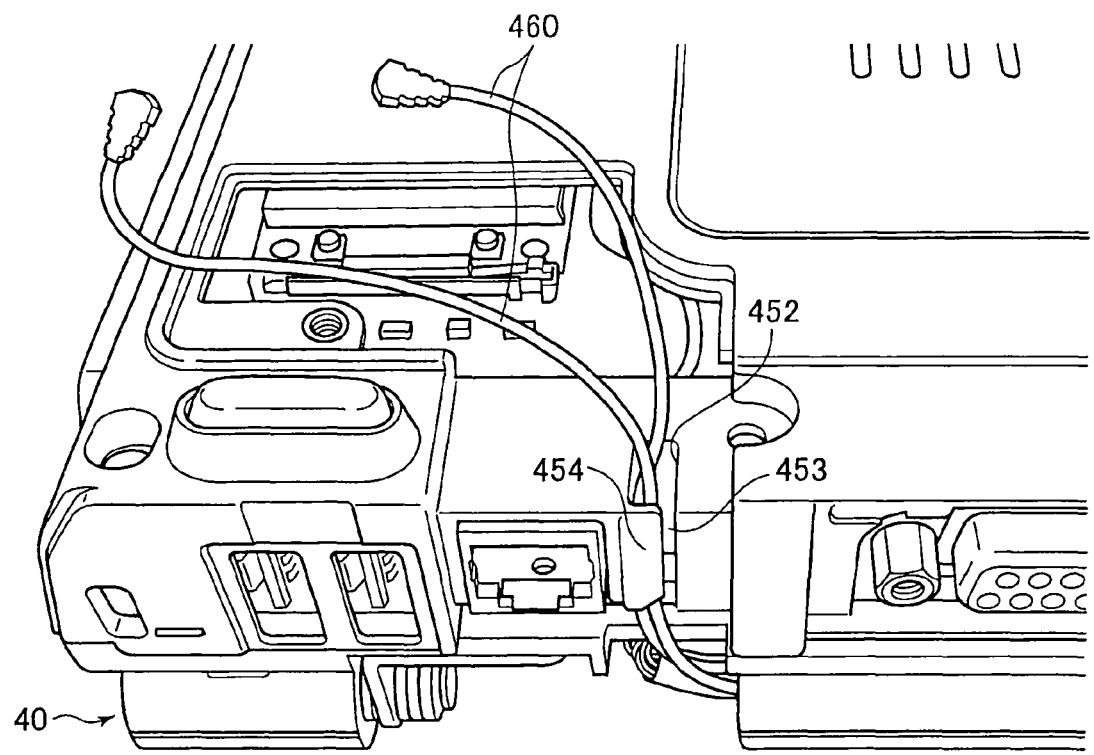
FIG. 26 is a schematic diagram showing an inside structure with the lid shown in FIG. 24 being removed.

FIG. 26 is a schematic diagram showing an inside structure with the lid 451 being removed.

A portion to be covered by the lid 451 is so formed as to sink at a depth equal to the thickness of the lid 451, so that the lid 451 becomes flush with the bottom surface of the main unit 20 when the lid 451 is put thereon.

FIG. 26 illustrates two cables 460 extending from the display unit 30 to the main unit 20 while running through the outside of the hinge section 40 shown in FIG. 1. The cables 460 each have an end in the main unit 20 side, which is not wired yet.

The main unit 20 has a vertically extending (in the thickness direction of the main unit 20) guide channel 452 for vertically guiding the cables 460. The main unit 20 also has a wing 454 for covering a side of the channel 452 while leaving a slit 453. The slit 453 has a width equal to the diameter of the cable 460 so that the cables 460 can be inserted into the channel 452 through the slit 453 from the side.

Thus, the cables 460 extending in the lateral direction from the display unit 30 are vertically guided by the channel 452 while making a curve. The slit 453 is formed in the inner side of the curve made by the cables 460 whereas the wing 454 is formed to cover the outer side of the curve. The cables 460 laterally extending from the display unit 30 tend to linearly extend due to rigidity thereof and therefore, the cables 460 stay in the side away from the slit 453 within the channel 452. Accordingly, it is possible to prevent the cables 460 from coming off through the slit 453.

As described above, the embodiment employs such a structure that the cables 460 running outside the hinge section are received and vertically guided by the channel 452. Thanks to such a structure, it is possible to prevent the cables 460 from running off the correct route in a stage when the end of the cable 460 is connected to a circuit in the main unit 20, specifically, in a stage when the end is connected to a circuit mounted on the bottom surface of the motherboard built in the main unit 20, or in a stage when the lid 451 shown in FIG. 25 is finally put on. Accordingly, assembly performance has been improved.

Figure 27:
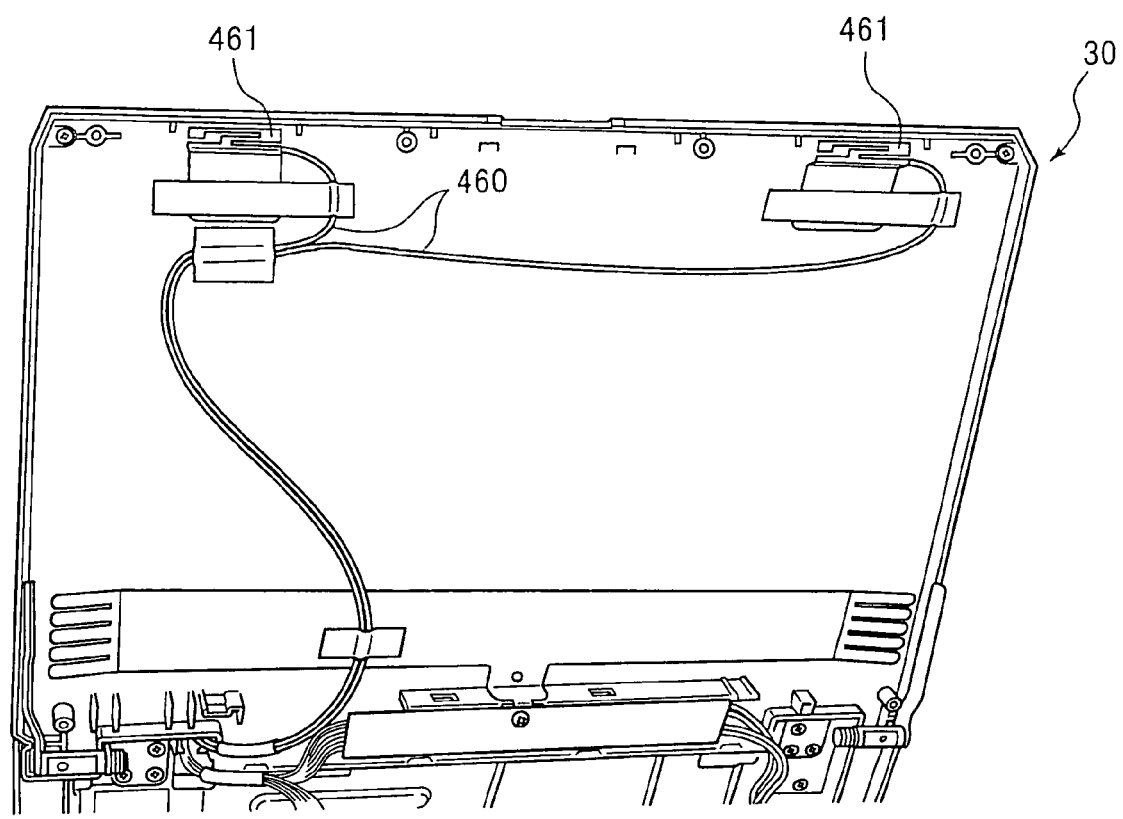
FIG. 27 is a diagram showing an inner surface of the display unit to which the rear surface of a display screen faces, with the display screen being removed.

FIG. 27 is a diagram showing an inner surface of the display unit 30 to which the rear surface of the display screen 301 faces, with the display screen 301 being removed. Disposed on an upper part of the display unit 30 are two antennas 461 used for wireless communication. The two antennas 461 are each connected to corresponding one of the two cables 460.

The cables 460 are disposed to downwardly extend until they come to a position closer to the hinge section 40 and then run outside the hinge section 40 as shown in FIG. 26 after passing through an opening formed in the housing of the main unit 20. Subsequently, the cables 460 are guided by the channel 452 and connected to a circuit, which is disposed on the bottom surface of the motherboard built in the main unit 20 and used for wireless communication by way of the antennas 461.

What is claimed is:

1. An electronic apparatus comprising:
   a housing having a hole used to secure a locking device;
   a board disposed in a primary space within the housing;
   a connector mounted to the board and disposed adjacent to the hole; and
   a support member that supports the connector,
   wherein
   the support member has both a partition supporting portion that supports the connector and a partition that defines a secondary space around the hole in cooperation with an inner wall of the housing,
   the partition being configured to substantially inhibit dust from entering the primary space of the housing via the hole and the secondary space,
   wherein the support member inhibits movement in a first direction parallel to a wall of the housing including the hole and a second direction perpendicular to the first direction and parallel to a second wall of the housing.

2. The electronic apparatus according to claim 1, wherein the connector is a connector for transferring signals to and from an external party.

3. The electronic apparatus according to claim 2, wherein the connector is a USB-compliant connector.

4. The electronic apparatus according to claim 1, wherein the housing is a box-shaped housing having the hole at a position adjacent to a corner of a side surface of the housing, and the support member defines two surfaces of the space around the hole.

5. The electronic apparatus according to claim 1, wherein the housing includes:
   a bottom cover having the hole, and
   a top cover that houses the board, the connector and the support member in cooperation with the bottom cover.

6. The electronic apparatus according to claim 1, wherein the hole is a through-hole open to connect the outside of the housing in a state in which the locking device is detached from the hole with the second space defined by the inner wall of the housing and the partition and the outside of the housing in a state in which the locking device is detached from the hole.

7. The electronic apparatus according to claim 1, wherein the partition includes a first portion that is substantially orthogonal to a second portion and the first portion and second portion define two walls of the secondary space.

8. The electronic apparatus according to claim 1, wherein the connector is configured to receive a data transfer cable.

9. The electronic apparatus according to claim 1, further comprising:
   at least one electronic component mounted on the board, wherein
   the connector is configured to couple the at least one electronic component to at least one of an external device and a network.

* * * * *